United States Patent
Galluzzo et al.

(10) Patent No.: US 11,602,857 B2
(45) Date of Patent: Mar. 14, 2023

(54) AUTONOMOUS MOBILE ROBOTIC SYSTEMS AND METHODS FOR PICKING AND PUT-AWAY

(71) Applicant: IAM ROBOTICS, LLC, Sewickley, PA (US)

(72) Inventors: Thomas Galluzzo, Gibsonia, PA (US);
Vladimir Altman, Pittsburgh, PA (US);
John Cameron, Wexford, PA (US);
Chris Grill, Monroeville, PA (US);
Mark Renfrew, Pittsburgh, PA (US);
Yash Manian, Pittsburgh, PA (US)

(73) Assignee: IAM Robotics, LLC, Pittsburgh, PA (US)

( * ) Notice: Subject to any disclaimer, the term of this patent is extended or adjusted under 35 U.S.C. 154(b) by 136 days.

(21) Appl. No.: 16/841,558

(22) Filed: Apr. 6, 2020

(65) Prior Publication Data
US 2020/0316786 A1    Oct. 8, 2020

Related U.S. Application Data

(60) Provisional application No. 62/987,084, filed on Mar. 9, 2020, provisional application No. 62/829,705, filed on Apr. 5, 2019.

(51) Int. Cl.
*B25J 13/08*    (2006.01)
*B25J 13/00*    (2006.01)
*B25J 9/16*    (2006.01)

(52) U.S. Cl.
CPC ............ *B25J 13/089* (2013.01); *B25J 9/161* (2013.01); *B25J 9/162* (2013.01); *B25J 9/1666* (2013.01); *B25J 9/1679* (2013.01); *B25J 13/006* (2013.01)

(58) Field of Classification Search
CPC . B25J 13/089; B25J 9/161; B25J 9/162; B25J 9/1666; B25J 9/1679; B25J 13/006; B25J 11/008; B25J 19/005; B25J 19/022; B25J 19/023; B25J 5/007; B65G 1/1378; G06Q 10/087
See application file for complete search history.

(56) References Cited

U.S. PATENT DOCUMENTS

| | | |
|---|---|---|
| 5,413,454 A | 5/1995 | Movsesian |
| 6,328,523 B1 | 12/2001 | Watanabe et al. |
| 6,626,632 B2 | 9/2003 | Guenzi et al. |
| 7,066,291 B2 | 6/2006 | Martins et al. |
| 7,153,085 B2 | 12/2006 | Clark et al. |
| 7,332,890 B2 | 2/2008 | Cohen et al. |

(Continued)

FOREIGN PATENT DOCUMENTS

| | | |
|---|---|---|
| EP | 0591845 | 4/1994 |
| EP | 1621296 | 2/2006 |
| WO | 2014025270 A1 | 2/2014 |

*Primary Examiner* — Jason Holloway
(74) *Attorney, Agent, or Firm* — Dentons Cohen & Grigsby P.C.

(57) ABSTRACT

A method and system for autonomous picking or put-away of items, totes, or cases within a logistics facility. The system includes a remote server and at least one manipulation robot. The system may further include at least one transport robot. The remote server is configured to communicate with the various robots to send and receive picking data, and the various robots are configured to autonomously navigate and position themselves within the logistics facility.

20 Claims, 21 Drawing Sheets

(56) References Cited

U.S. PATENT DOCUMENTS

| | | |
|---|---|---|
| 7,693,757 B2 | 4/2010 | Zimmerman |
| 7,751,928 B1 | 7/2010 | Antony |
| 7,765,780 B2 | 8/2010 | Koselka et al. |
| 7,854,108 B2 | 12/2010 | Koselka et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,920,962 B2 | 4/2011 | D'Andrea et al. |
| 7,912,574 B2 | 5/2011 | Wuman et al. |
| 7,991,505 B2 | 8/2011 | Lert, Jr. et al. |
| 7,996,109 B2 | 8/2011 | Zini et al. |
| 8,010,230 B2 | 8/2011 | Zini et al. |
| 8,170,711 B2 | 5/2012 | D'Andrea et al. |
| 8,220,710 B2 | 7/2012 | Hoffman et al. |
| 8,265,873 B2 | 9/2012 | D'Andrea et al. |
| 8,280,547 B2 | 10/2012 | D'Andrea et al. |
| 8,315,736 B2 | 11/2012 | Kalbavi et al. |
| 8,381,501 B2 | 2/2013 | Koselka et al. |
| 8,412,400 B2 | 4/2013 | D'Andrea et al. |
| 8,467,898 B2 | 6/2013 | Cardoni |
| 8,483,869 B2 | 7/2013 | Wurman et al. |
| 8,538,692 B2 | 9/2013 | Wuman et al. |
| 8,594,834 B1 | 11/2013 | Clark et al. |
| 8,606,392 B2 | 12/2013 | Wuman et al. |
| 8,626,335 B2 | 1/2014 | Wuman et al. |
| 8,639,382 B1 | 1/2014 | Clark et al. |
| 8,718,814 B1 | 5/2014 | Clark et al. |
| 8,725,286 B2 | 5/2014 | D'Andrea et al. |
| 9,174,758 B1 | 11/2015 | Rowley |
| 9,758,305 B2 | 9/2017 | Johnson et al. |
| 9,776,324 B1 | 10/2017 | Johnson et al. |
| 10,001,768 B2 | 6/2018 | Johnson et al. |
| 10,040,194 B1 | 8/2018 | Theobald |
| 10,048,691 B2 | 8/2018 | Reiff et al. |
| 2004/0093650 A1 | 5/2004 | Martins |
| 2004/0030611 A1 | 12/2004 | Byrne |
| 2005/0226711 A1 | 10/2005 | Bernd et al. |
| 2006/0072988 A1 | 4/2006 | Kazuo et al. |
| 2007/0119123 A1 | 5/2007 | Clark et al. |
| 2007/0255453 A1 | 11/2007 | Brogardh |
| 2008/0077511 A1 | 3/2008 | Zimmerman |
| 2010/0155156 A1 | 6/2010 | Finkelstein |
| 2011/0163160 A1 | 7/2011 | Zini et al. |
| 2011/0223001 A1 | 9/2011 | Martinez et al. |
| 2012/0029697 A1 | 2/2012 | Ota et al. |
| 2012/0191272 A1 | 7/2012 | Andersen |
| 2012/0321423 A1 | 12/2012 | MacKnight |
| 2012/0323358 A1 | 12/2012 | Izumi et al. |
| 2012/0328395 A1 | 12/2012 | Jacobsen |
| 2012/0330458 A1 | 12/2012 | Weiss |
| 2013/0096713 A1 | 4/2013 | Takizawa |
| 2013/0226340 A1 | 8/2013 | Buchstab |
| 2013/0245811 A1 | 9/2013 | Holmes |
| 2013/0317642 A1 | 11/2013 | Asaria et al. |
| 2014/0017048 A1 | 1/2014 | Mattern |
| 2014/0025198 A1 | 1/2014 | Mattern |
| 2014/0046512 A1 | 2/2014 | Villamar |
| 2014/0081445 A1 | 3/2014 | Villamar |
| 2014/0136255 A1 | 5/2014 | Grabovski |
| 2014/0214196 A1 | 7/2014 | Worsley |
| 2014/0088758 A1 | 8/2014 | Lert et al. |
| 2014/0222191 A1 | 8/2014 | Blumenau |
| 2014/0277691 A1 | 9/2014 | Jacobus |
| 2015/0032252 A1* | 1/2015 | Galluzzo .............. G05D 1/0248 700/218 |
| 2015/0360865 A1* | 12/2015 | Massey ................. B25J 11/008 414/275 |
| 2017/0102711 A1* | 4/2017 | Watts ................... G05D 1/0231 |
| 2017/0183157 A9 | 6/2017 | Massey |
| 2017/0336780 A1 | 11/2017 | Wise et al. |
| 2018/0081369 A1* | 3/2018 | Fischer .................. G05D 1/024 |
| 2018/0088586 A1* | 3/2018 | Hance .................... G06Q 50/28 |
| 2018/0139593 A1 | 5/2018 | Chun et al. |

\* cited by examiner

AUTONOMOUS MOBILE ROBOTIC SYSTEMS AND METHODS FOR PICKING AND PUT-AWAY

CROSS-REFERENCE TO RELATED APPLICATIONS

The present application claims the benefit under 35 U.S.C. § 119(e) of prior U.S. Provisional Application Ser. No. 62/829,705, filed on Apr. 5, 2019, and U.S. Provisional Application Ser. No. 62/987,084, filed on Mar. 9, 2020, the contents of each incorporated by reference herein.

TECHNICAL FIELD

This invention relates generally to supply chain, manufacturing, and logistics automation equipment, systems, and methods. More specifically, the present invention is directed to systems, devices, and methods useful for the purpose of autonomously picking items or bins from, and replacing items or bins to, storage locations within a logistics facility.

BACKGROUND

Warehousing employers are facing increasing pressures on cost and delivery time from the exploding e-commerce industry. This comes at a time when many companies are facing a national labor shortage of workers to fill these warehouse jobs. For employees, these changes are demanding increased pick rates and hours. Additionally, many in the warehouse workforce spend up to 90% of their time just walking from one item to the next. The result is unhappy employees with turnover rates harmful to business. The employees that stay typically experience high rates of work-related injuries from lifting and repetitive motions.

Currently, warehouse or retail facilities follow a standard process for put-away and picking of goods. Items arrive into the facility at a receiving area, typically in cases or pallets, and are registered into an Inventory Management System (IMS) or Warehouse Management System (WMS). The IMS or WMS is a software database that stores information about the items, such as size, weight, inventory count, storage location, etc. After the items are received into the warehouse or retail facility, they are put-away into their storage locations, generally open shelving or racks. When an order for items is received and registered with the WMS, a work order is created, commonly known as a pick list. The pick list instructs the human worker, or "picker", about the items to be retrieved, i.e., identities, quantities, and locations within the facility. The picker then finds the items and physically transfers them to a shipping container associated with the order.

The time consuming and very manual nature of put-away and picking makes it a costly process and, therefore, one that has led to intense scrutiny by organizations looking to save time and money. There are currently many solutions for both optimizing and automating various aspects of the process, ranging from augmenting manual labor with various technologies to completely replacing labor with customized picking equipment and infrastructure. For example, some automation systems support manual pick workers with autonomous mobile robots (AMR) that enable them to more rapidly locate and identify a product. Others, such as large-scale goods-to-person automated storage and retrieval systems (AS/RS) allow a pick worker to remain in a fixed location. These systems have movable SKU storage bins that can be carried by a machine to and from a fixed storage location and delivered to a worker for picking individual items out of the bins. There are also automated guided vehicle (AGV) systems that can transfer entire storage racks to and from a pick area where a worker can locate and grab the requested item.

The automation equipment technologies presently available for robotic picking operations generally require a substantial modification of infrastructure for the warehouse or distribution center in which they are used. This requires a significant up-front investment from the facility, which may be difficult to afford and is the main reason such solutions have not been widely adopted. As such, many distribution facilities still rely on manual labor to accomplish picking. Further, current automation systems are generally not viable for retail centers because the infrastructure must also be accessible to the customer. That is, most current automation equipment cannot be used within a retail facility which relies on simple static shelving for product storage and display.

Moreover, current automated inventory management systems face significant challenges in responding to requests for inventory items. As inventory grows, the size of the facilities that store and/or process the inventory also grows, and the challenges of locating the inventory within the facility becomes non-trivial. Prior art solutions to this problem include all manner of unique navigation marker and stochastic distribution methods for those markers about a 3-D space. These current methods, however, are limited to the total unique markers available, and require either previous manual mapping of locations within the logistics facility and association of those locations with these markers, or simultaneous localization and mapping (SLAM). These current technologies do not provide the robotic systems with any a priori assumptions that the robot may use to initially localize within a facility. Rather, current robots generally query a stored map (either locally or online) on every localization attempt.

Accordingly, a solution that does not require changing significant infrastructure in a facility, such as using existing shelving and racks, and works side-by-side with manual labor is desired. Moreover, a solution that may expedite and improve item localization and pick accuracy is desired.

SUMMARY

The presently disclosed invention overcomes many of the shortcomings of the prior art by providing systems, devices, and methods for robotic picking or put-away within a standard logistics facility. Such systems may be configured to dynamically respond to changes in pick or put-away volume, in addition to changes in the available manual labor, providing systems and methods flexible enough to work side-by-side with human pick workers. Moreover, the presently disclosed systems and methods may improve the accuracy and efficiency of that automation within a logistics facility.

The presently disclosed invention further overcomes shortcomings of the prior art by providing systems, devices, and methods for distributing a finite set of markers across a 3-D logistics facility map of potentially indefinite span in each axis for the purpose of robot localization, mapping, and region of interest segmentation. More specifically, for robotic systems having a navigational accuracy lower than the resolution required to perform an intended function, such as picking items, the presently disclosed invention allows the robot to accommodate for its navigational deficiencies in an essentially indefinite span.

Accordingly, provided herein is an autonomous mobile robot (AMR), or transport robot, comprising a mobile base; a plurality of sensors; a remote communication interface; a memory configured to store robot specific information; and one or more robot processors coupled to the plurality of optical sensors, the memory, and the mobile base, wherein the memory comprises computer program instructions executable by the one or more robot processors to receive data from and send data to a remote server (e.g., warehouse management system, central server, etc.), process data received from each of the sensors, and output control signals to the mobile base.

According to certain aspects, at least one of the sensors of the transport robot may be a laser ranging device positioned to provide a 180-degree field of view (FOV), such as a 240-degree FOV or even a 270-degree FOV of the surrounding environment, and front and rear facing sensors configured to allow both forward and reverse navigation of the transport robot. According to certain aspects, the transport robot may include an integral transport platform or may be configured for customization so that a custom transport platform may be attached. In either case, the transport platform is positioned above and vertically separated from a mobile base of the transport robot. According to certain other aspects, the transport platform may include a conveyance system.

Also provided herein are systems comprising any of the transport robots disclosed herein; a central server; and at least one autonomous mobile manipulation robot (AMMR) or manipulation robot. The manipulation robot may comprise at least one manipulator arm having a first end portion pivotally carried by a mobile base and a second end portion comprising an end effector; at least one containment area; a plurality of sensors; one or more processors; a remote communication device; and a memory comprising computer program instructions executable by the one or more processors to receive data from and send data to the remote server, process data received from each of the plurality of onboard sensors, and output control signals to the mobile base and the at least one manipulator arm, wherein the control signals guide the end effector of the at least one manipulator arm to pick the item with a collision free path throughout a controlled motion of the at least one manipulator arm, and wherein the at least one manipulation robot is configured to adjust a height of the at least one containment area to match a height of a transport platform of the transport robot and transfer the item thereto.

According to certain aspects, the manipulation robot may include an extension tool positioned at or near the second end portion of the manipulator arm that is configured to provide access for the end effector to an item without interference from surrounding items or infrastructure within a logistics facility. According to certain aspects, the manipulator arm may be attached to a distal end of a platform, wherein a proximal end of the platform is connected to a vertical track on the mobile base, and wherein the platform includes the item containment area. Vertical movement of the platform on the vertical track of the mobile base adjusts the height of the at least one item containment area.

Also provided herein are methods for accurate order fulfillment that include redundant pick locations, wherein a manipulation robot may be directed to second and third pick locations when unable to pick an item at a first location. Alternatively, or in addition, the manipulation robot may send an image of the pick location to a human operator when unable to pick an item, wherein the image displays one or more possible items, and the human operator may select a correct item from the one or more possible items.

Also provided herein are methods for more efficient item storage and localization within a logistics facility, wherein a manipulation robot may store or pick high-frequency items to/from high-frequency storage location(s) within the logistics facility, and may store or pick low-frequency items to/from low-frequency storage location(s) within the logistics facility. The method may be implemented on a warehouse management system (WMS) and/or a central server of an autonomous robotic system and may be updated with data from one or more of the robot systems operating in the facility.

Also provided herein are methods for localization and mapping of a finite number of unique identifiers to an indefinite 3-D space using a periodic function that has the width of one identifier in metric space as a minimum resolution. According to certain aspects, identifiers may be assigned to a region of interest. The identifiers may comprise a set of two identifiers, wherein the two identifiers are positioned at horizontal limits of the region of interest (i.e., on the same z plane).

The present invention further provides a method for autonomous robot navigation and region of interest localization. The method may comprise receiving data captured by a sensor coupled to an autonomous robot during navigation of the autonomous robot. The data may include information from one or more identifiers positioned at specific regions of interest. The received data may then be analyzed to determine a location of the region of intertest, and to generate a navigation instruction for navigation of the autonomous robot based on the determined location. The at least one identifier may comprise two identifiers, each positioned at ends of the region of interest.

According to certain aspects, the region of interest may correlate with an identity of an element positioned therein. According to certain aspects, the identifier may comprise a fiducial marker, such as an ArUco code. According to certain aspects, a location of the region of interest may be within a logistics facility comprising racks having multiple shelves, and the location comprises a set of x, y, and z coordinates (x,y provide position in logistics facility of a rack and shelf on the rack, and z position provides the height of the shelf).

According to certain aspects, the at least one identifier may comprise a first marker that defines an x and y coordinate of the region of interest, and at least one second marker that defines and x, y, and z coordinate of the region of interest. According to certain aspects, the at least one second marker comprises two markers positioned at horizontal edges of the region of interest.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized, and other changes may be made without departing from the spirit or scope of the subject matter presented herein.

DETAILED DESCRIPTION

Figure 1:
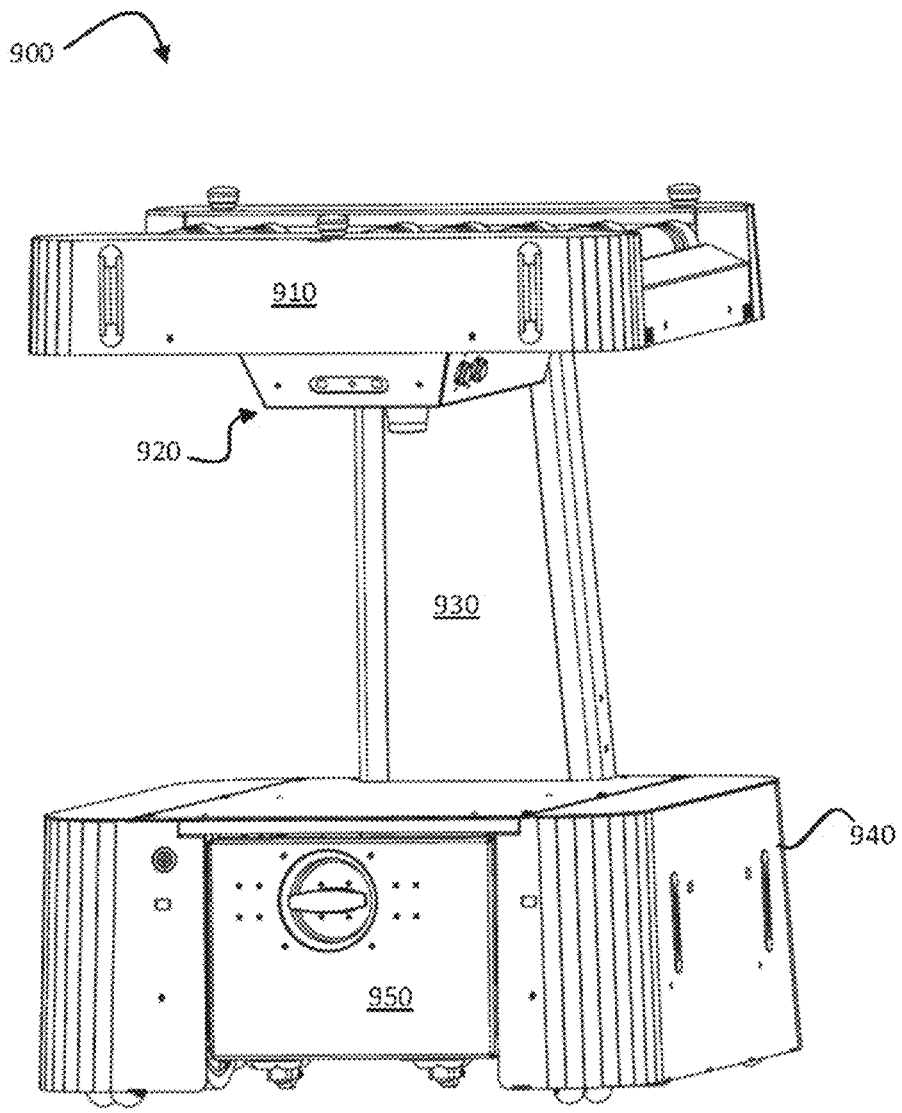
FIG. 1 illustrates a front perspective view of an autonomous mobile robot (AMR) or transport robot in accordance with certain aspects of the presently disclosed invention.

The present disclosure describes systems and methods for automated robotic picking and/or put-away within a logistics facility. Logistics facilities generally include, but are not limited to warehouses, distribution centers, manufacturing facilities, and retail facilities. The presently disclosed systems and methods utilize both robotics hardware and software technologies that are detailed in the following description. The above summary and drawings are not intended to describe or show each illustrated embodiment or every possible implementation of the presently disclosed invention.

Various aspects of the systems and methods for picking and/or put-away with a transport robot, manipulation robot, or combination thereof may be illustrated by describing components that are coupled, attached, and/or joined together. The terms "coupled", "attached", and/or "joined" are interchangeably used in this disclosure to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" are used herein to describe one element's relationship to another element illustrated in the drawings. It will be understood that relative terms are intended to encompass different orientations of aspects of the system in addition to the orientation depicted in the drawings. By way of example, if aspects of the transport robot shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

As defined herein, a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least 1D-barcodes such as a Universal Product Code (UPC), International Article Number (EAN), Global Trade Item Number (GTIN), Code 39 barcode, Code 128 barcode, Interleaved 2 of 5 (ITF), Code 93, Codabar, GS1 databar, and MSI Plessy. Examples further include 2D-codes such as a QR code, Datamatrix code, PDF417 code, Aztec code, and ArUco markers.

The terms "goods," "products," "items," and SKUs may be used interchangeably, and may be taken to indicate items that need to be retrieved and/or stored. Such items can include any consumer product, including but not limited to, packaged and unpackaged products (e.g., packaged food and individual units of food such as produce). Such items can also include items that are not considered consumer products (e.g., library items). Furthermore, while each of these terms is generally understood to indicate a single unit, these terms may refer to groups of these units packaged together, such as in a multipack or in a case.

The terms "bin" and "tote" are also used interchangeably, and may be taken to mean a container used to store products or goods while they are located on a shelf within a logistics facility, or as they are moved throughout the logistics facility on a robotic system or conveyor belt.

The process of selecting and retrieving items, totes, or cases from a specific storage location in a facility is referred to as "picking", wherein selection of individual products or items may also be referred to as piece-picking or each-picking. The process of breaking cases for individual product picking, i.e., taking the individual items from the case or pallet and placing them in a specific storage location in a facility, is called "put-away". Put-away may also comprise placing totes or cases in a specific location within a facility or placing multipacks in a specific location within a facility. Picking and put-away occurs in both distribution warehouses and retail centers.

The terms "storage" and "data storage" and "memory," when used in the context of a computer system or method, may be used interchangeably and may be taken to indicate both transient and permanent storage (i.e., on a non-volatile memory hardware device) of data on a computer.

The term "logistics" facility may be taken to mean any facility that provides for the efficient production, storage, and/or flow of goods. Exemplary logistics facilities include at least warehouses, distribution centers, retail centers, and manufacturing facilities.

The terms "shelf" and "rack" are used to indicate a storage unit within a logistics facility. As used here, however, these terms may also refer to locations or regions of interest within a logistics facility. Moreover, while the term "slot" is used with respect to a shelf or rack to indicate a defined section having specifically delimited edges, the term slot may also be understood to refer to a region of interest. Thus, for example, a slot may also be understood to indicate a general position on a floor within a logistics facility or on a shelf in which an item or bin or tote may be stored.

The term "warehouse management system" or WMS may be understood to mean any database which stores information about items or products stored within a logistics facility, and may include the product size, weight, inventory count, storage location, etc. The terms "warehouse execution system," or WES and "warehouse control system," or WCS may be understood to mean a software application that directs the real-time activities within logistics facility. The terms warehouse management system, WMS, warehouse execution system, WES, warehouse control system, and WCS are used interchangeably herein, and reference to one may comprise reference to any or all of these terms. Moreover, the term "remote server" may be used to refer to at least a processor/memory of a computing system remote from the robotic system being discussed, such as the central server or a processor/memory of the WMS, WES, and/or WCS.

As used herein, the terms "shelf tag" and "marker" may refer to an object used to identify a location. Most commonly a shelf tag or marker may be a fiducial marker placeable in the field of view of an imaging system. Exemplary fiducial markers include at least 1D and 2D bar codes and ArUco markers. Shelf tags or marker may also be understood to refer to an object that is not visually perceived, such as RFID, sound, or tactile markers that may identify or differentiate an identity.

The presently disclosed invention relates to autonomous mobile robots (AMRs) configured to transport items, bins, or cases within a logistics facility. The AMRs may be part of a system comprising autonomous mobile manipulation robots (AMMRs) configured to pick and put-away items, bins, or cases within a logistics facility. The AMRs may be configured to send and receive items, bins, or cases from the AMMRs, human workers, and/or a conveyance system. The AMMRs may be configured to pick and place items, bins, or cases from storage locations, the AMRs, human workers, and/or a conveyance system.

The presently disclosed invention further relates to methods for picking and put-away using the AMRs, AMMRs, and/or systems comprising both. Such methods may include dynamic selection of work areas for each of the robots and/or humans working in a logistics facility and may further include dynamic storage and retrieval of high frequency items, bins, or cases at specific high-frequency locations within a logistics facility.

The presently disclosed invention further relates to redundant storage and pick methods that greatly increase overall pick accuracy.

The presently disclosed invention also relates to mapping and localization of specific regions of interest in an indefinite space. One specific application of the presently disclosed invention includes use of mapped locations for position and orientation (pose) recognition by a robot within a logistics facility. Other applications include use of specifically defined regions or interest for order fulfillment applications by AMRs and AMMRs that operate in a wide range of logistics facilities, including warehouses, distributions centers, and retail locations.

Referring now to the drawings, FIGS. 1-3, 5-7B, and 16A-20 illustrate various designs for an autonomous mobile robot (AMR), or "transport" robot (900, 900') according to certain aspects of the presently disclosed invention. The transport robots presently disclosed are unique in offering forward and reverse navigation and a 360-degree field of view provided by a laser ranging device, such as LIDAR, augmented with 3D cameras. For example, the transport robot is designed to afford up to a 270-degree field of view for the laser ranging device. Moreover, the transport robot may include an integral transport platform positioned above and vertically separated from a mobile base, providing for storage and transport of items, bins, or cases on a top of either the mobile base or the transport platform, the latter of which may include a conveyance means for easy send/receive of the items, bins, or cases.

With specific reference to FIG. 1, an exemplary design of a transport robot 900 according to the presently disclosed invention is shown. The transport robot 900 generally includes a mobile base 940, an attachment arm 930, and a transport platform 910. Also shown is a sensor housing 920 positioned on a bottom surface of the transport platform 910.

The transport platform 910 may be position over and separated vertically from the mobile base 940 by connection to the attachment arm, such as by connection to an end of the attachment arm 930 that is distal from and end connected to the mobile base 940. According to certain aspects, the attachment arm 930 may be positioned at and edge of each of the mobile base 940 and the transport platform 910 to provide opportunity for additional storage on a top surface of the mobile base (i.e., the attachment arm is not centrally located on the mobile base or the transport platform; 942 of FIG. 2). Additionally, such positioning of the attachment arm 930 provides an open or enhanced field of view for sensors positioned in/on the sensor housing 920. Also shown in FIG. 1 is a position of a field replaceable battery 950 in the mobile base.

Figure 2:
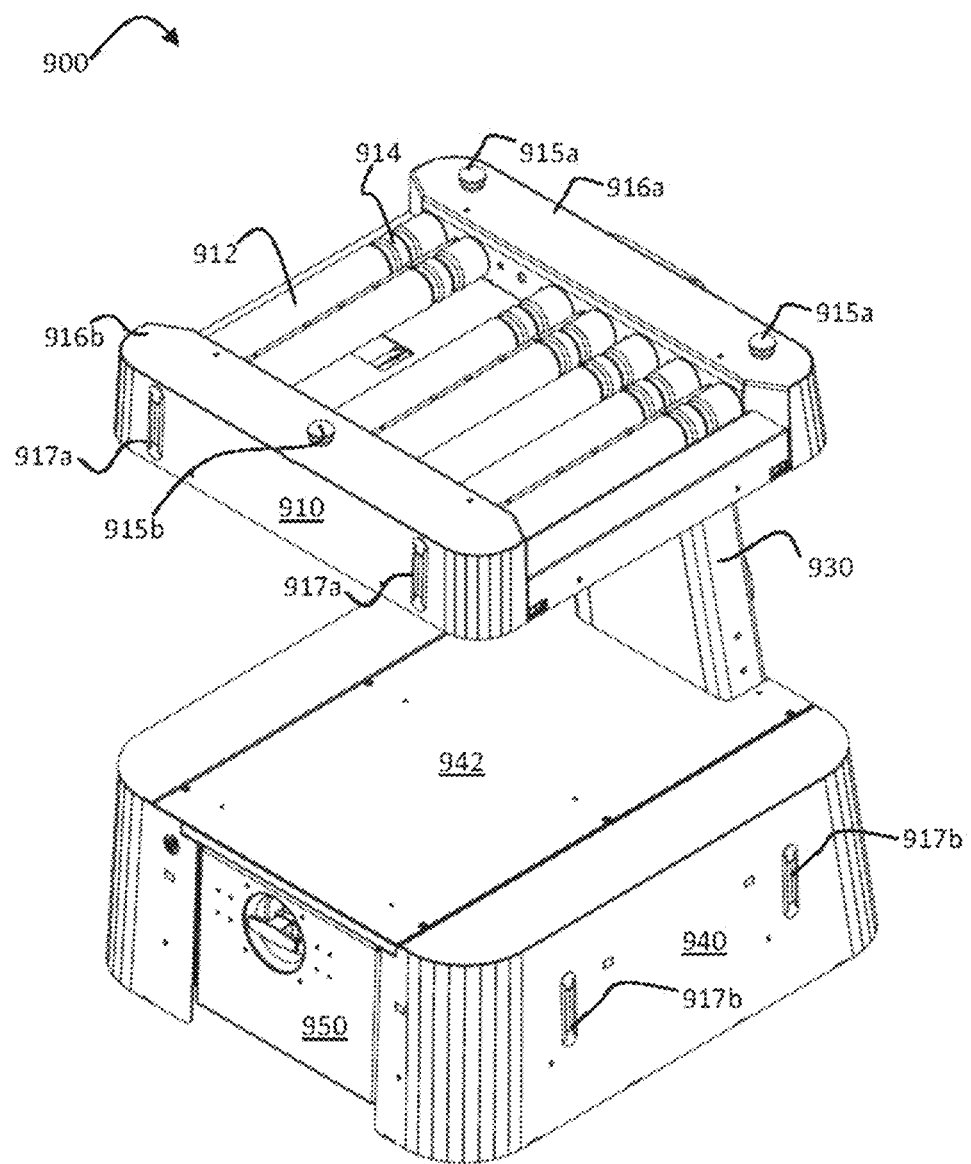
FIG. 2 illustrates a top perspective view of the transport robot shown in FIG. 1.

FIG. 2 shows a top perspective view of the transport robot 900 illustrating a conveyance system of the transport platform 910. An exemplary conveyance system may include a plurality of roller bars 912 as shown, or any other conveyance system known in the art, such as a conveyor belt. The roller bars 912 may include regions that provide enhanced traction 914, such as rubber gaskets or O-rings. The transport platform 910 may further include a front and back rim (916a and 916b, respectively) that may ensure proper placement of an item, bin, or tote on the conveyance system.

The transport robot 900 may also include lights (917a, 917b) on the transport platform 910 and mobile base 940, respectively. These lights may be used to improve visibility conditions for the various sensors on the transport robot 900, may improve visibility conditions for other devices that may need to identify the transport robot, such as a manipulation robot (described in detail hereinbelow), and/or may improve visibility for human workers in the vicinity of the transport robot.

The transport robot 900 may also include a safety stop switch, button, or toggle that may be accessible by a human worker to provide means to immediately stop the action of the robot. Exemplary safety stop buttons (915a, 915b) are shown on a top surface of the transport platform 910.

Figure 3:
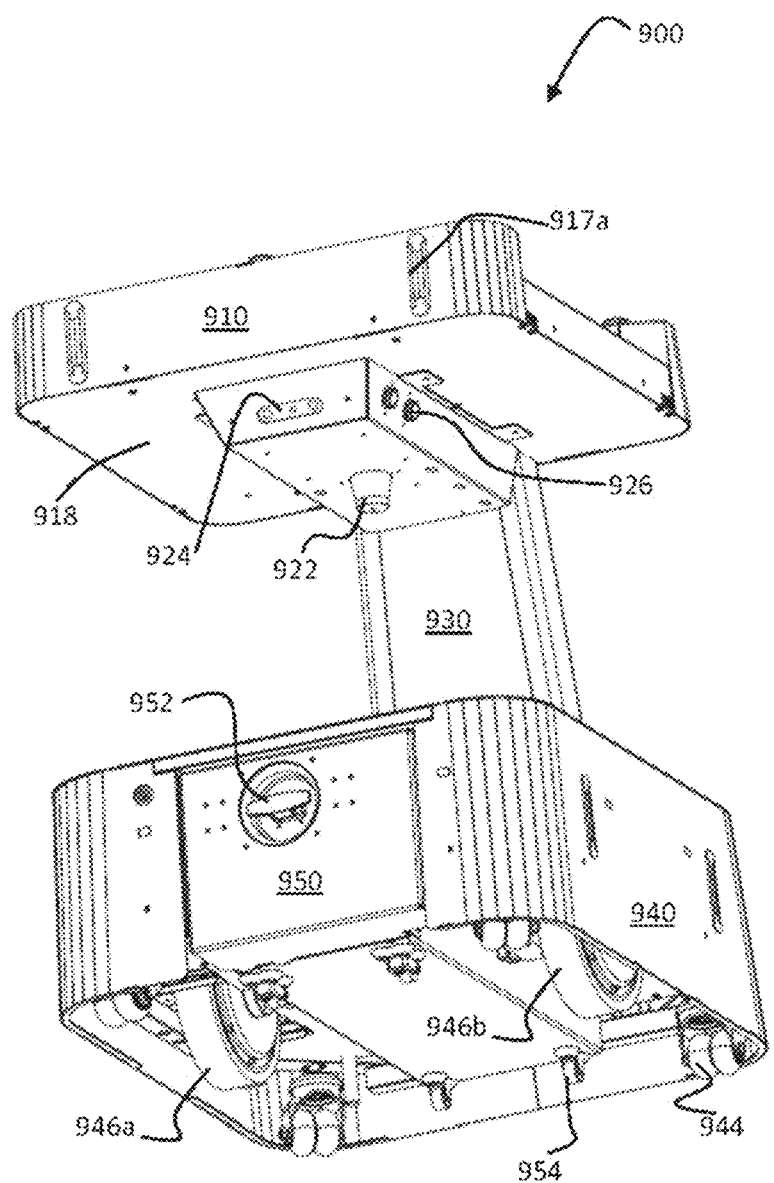
FIG. 3 illustrates a bottom perspective view of the transport robot shown in FIG. 1.
Figure 6A:
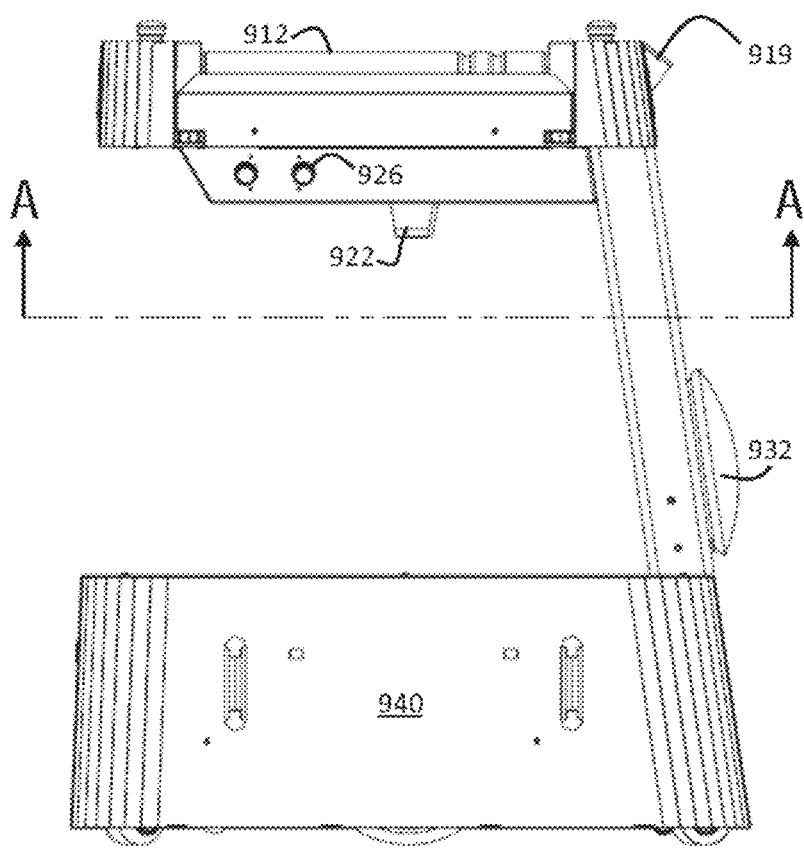
FIG. 6A illustrates a right side view of the transport robot shown in FIG. 1.
Figure 6B:
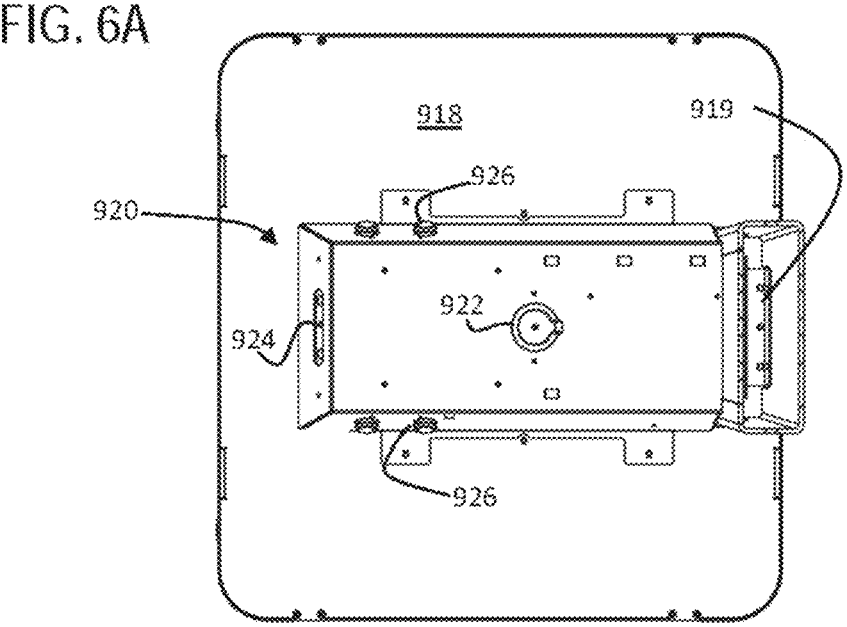
FIG. 6B illustrates a sectional view taken along line A-A of FIG. 6A.

FIGS. 3 and 6B show a position for a sensor housing 920 on a bottom surface 918 of the transport platform 910, and various sensors that are positioned thereon, which may include forward facing sensors 924, side facing sensors 926, rear facing sensors 919 (FIG. 6B), and a laser ranging device 922, or LiDAR. These exteroceptive sensors may be differentiated from sensors included on the robot that may be proprioceptive, such as accelerometers, gyroscopes, strain gauges, magnetometers and a compass, wheel encoders, and temperature sensors. The forward, side, and rear facing sensors (924, 926, and 919, respectively) may include any of cameras, depth cameras, laser and/or LiDAR devices, radar, sonar, infrared, touch sensors such as whiskers or bump sensors, GPS, and proximity sensors. Exemplary cameras may include any of 3D or structured light depth cameras, stereo cameras, color cameras, grey scale cameras, and combinations thereof. According to certain aspects of the presently disclosed invention, the side facing sensors 926 may include stereo cameras and the forward and rear facing sensors (924 and 919, respectively) may include structured light depth cameras (3D cameras). This unique design allows the transport robot 900 to navigate while driving both forwards and backwards and may provide a full 360-degree field of view of the environment around the transport robot 900.

Figure 7A:
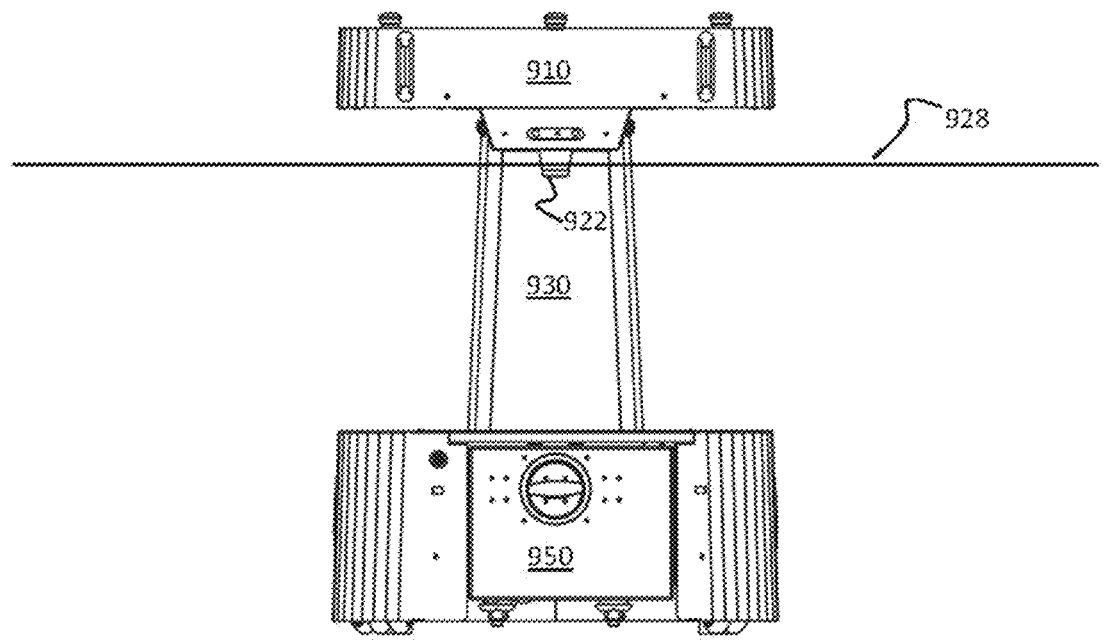
FIG. 7A illustrates a front view of the transport robot shown in FIG. 1, depicting a field of view of the laser ranging device on the transport robot in accordance with certain aspects of the presently disclosed invention.
Figure 7B:
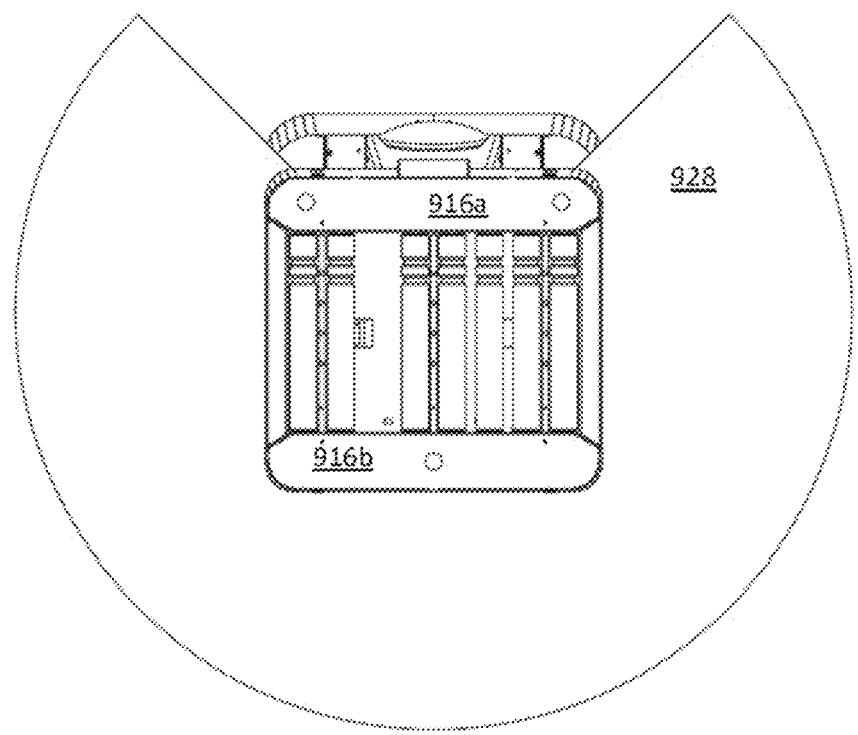
FIG. 7B illustrates a top view of the laser ranging device field of view shown in FIG. 7A.

With reference to FIGS. 7A and 7B, an exemplary field of view 928 of the laser ranging device 922 is shown, which is substantially or completely unobstructed by items contained on the transport platform 910 or other portions of the transport robot 900. As shown in FIG. 7B, the field of view may include angles greater than 180 degrees, such as up to and including 270 degrees, such that the transport robot 900 may view objects both in front and to either side thereof. Moreover, placement of the laser ranging device 922 at a position substantially elevated from the ground assists in observing other robots and humans in the work environment. It is also positioned such that the robot itself does not occlude the field of view of the sensor.

With continued reference to FIG. 3, a bottom perspective view of the transport robot 900 illustrating a drive system is shown. An exemplary drive system includes two drive wheels (946a, 946b), wherein each drive wheel may be controlled by a servo motor. The mobile transport robot 900 may include an onboard computer processor 978 (see FIG. 10). Each drive wheel (946a, 946b) may have an encoder that provides motion feedback to the processor 978, which can be used to precisely control the speed of each wheel in order to achieve the desired rotation and translation velocities of the robot 900. The feedback data may also be used for odometry to estimate the motion of the robot 900 relative to the facility. The odometry may be responsible for guiding the robot 900 navigation at times when visual markers are out of sensor range (see for example marker 420 shown in FIG. 12). The mobile base 940 may also use passive wheels, such as casters 944, for stability and weight distribution.

Figure 10:
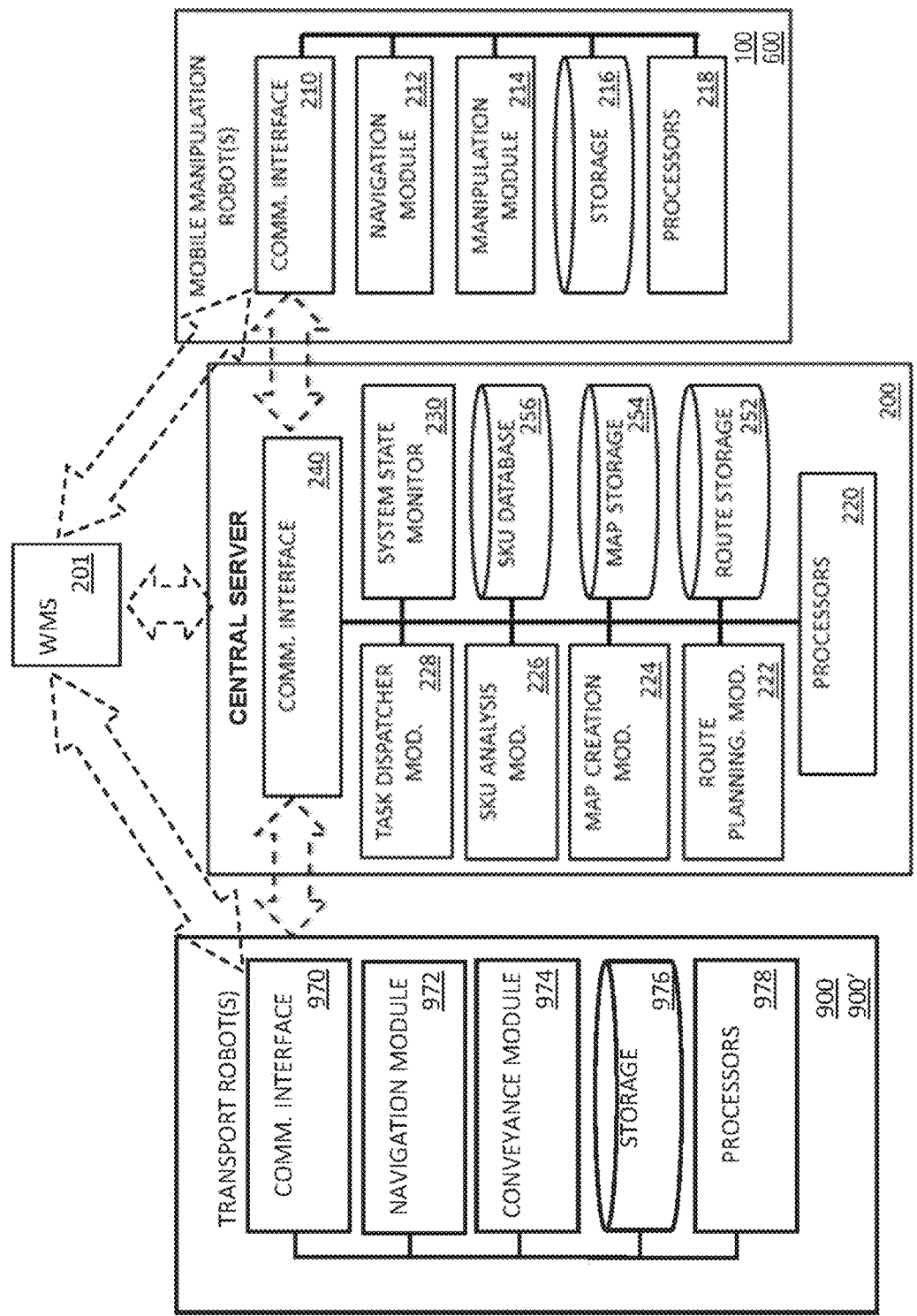
FIG. 10 illustrates a block diagram of a robotic system with hardware and software modules of a central server and a plurality of manipulation robots in accordance with certain aspects of the presently disclosed invention.

With reference to FIG. 10, the transport robot 900 further includes one or more onboard processors 978, an onboard storage or memory 976, and a remote communication interface 970 that allows communication with external servers (201, 240), the internet, and other similar or dissimilar robots (210). This communication may be established through a wireless network via a wireless access point. For example, with reference to FIGS. 5 and 6A, the transport robot 900 may include a Wi-Fi access point 932, such as on a rear portion of the attachment arm 930. While shown in a specific position, other positions for the remote communication interface are possible and within the scope of the presently disclosed invention. Moreover, various other types of communication are possible and may be used in addition to, or as an alternative to wireless communication, such as a tethered wire connection or other point-to-point wireless data exchange.

Figure 8:
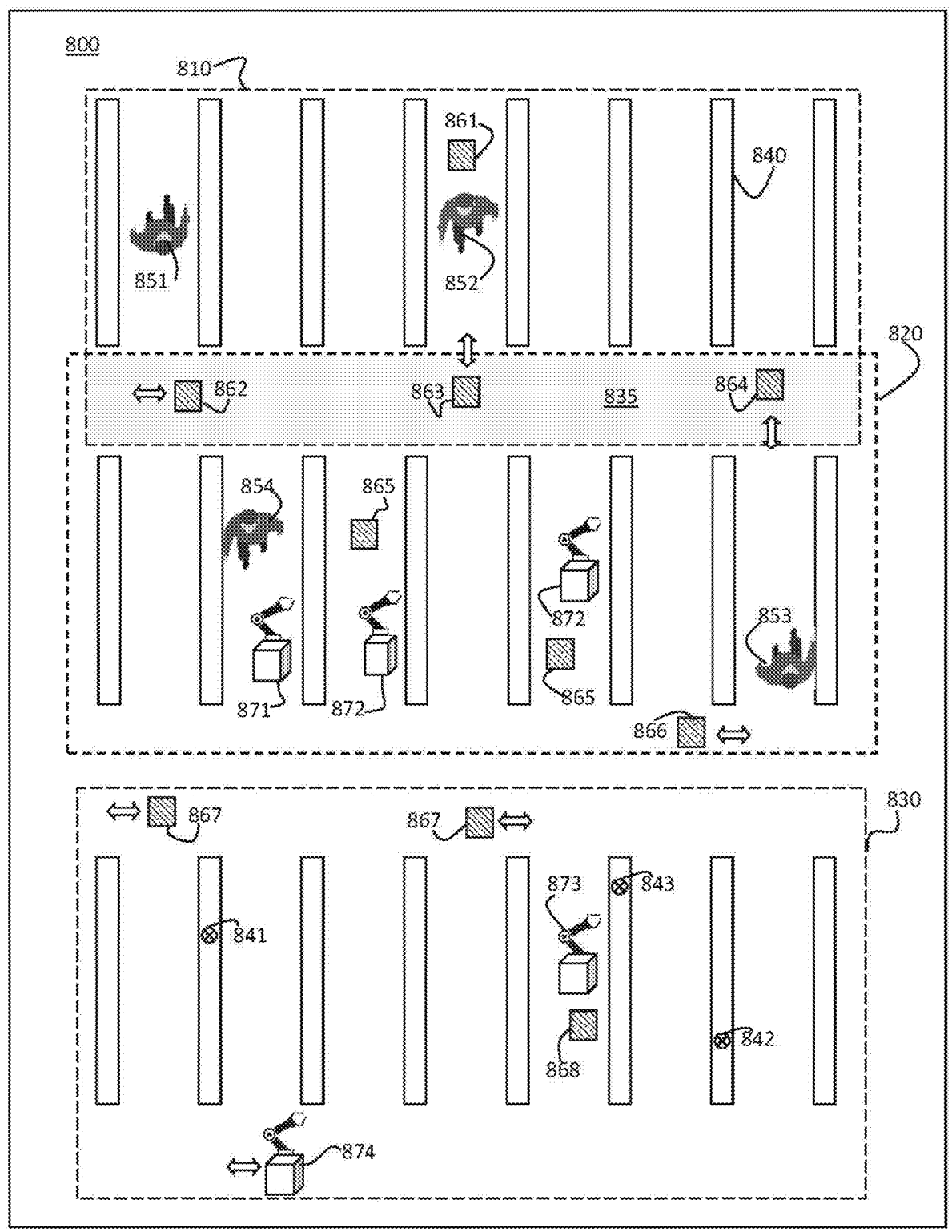
FIG. 8 illustrates a simplified overhead floor plan view of a representative logistics facility in accordance with certain aspects of the presently disclosed invention.
Figure 11:
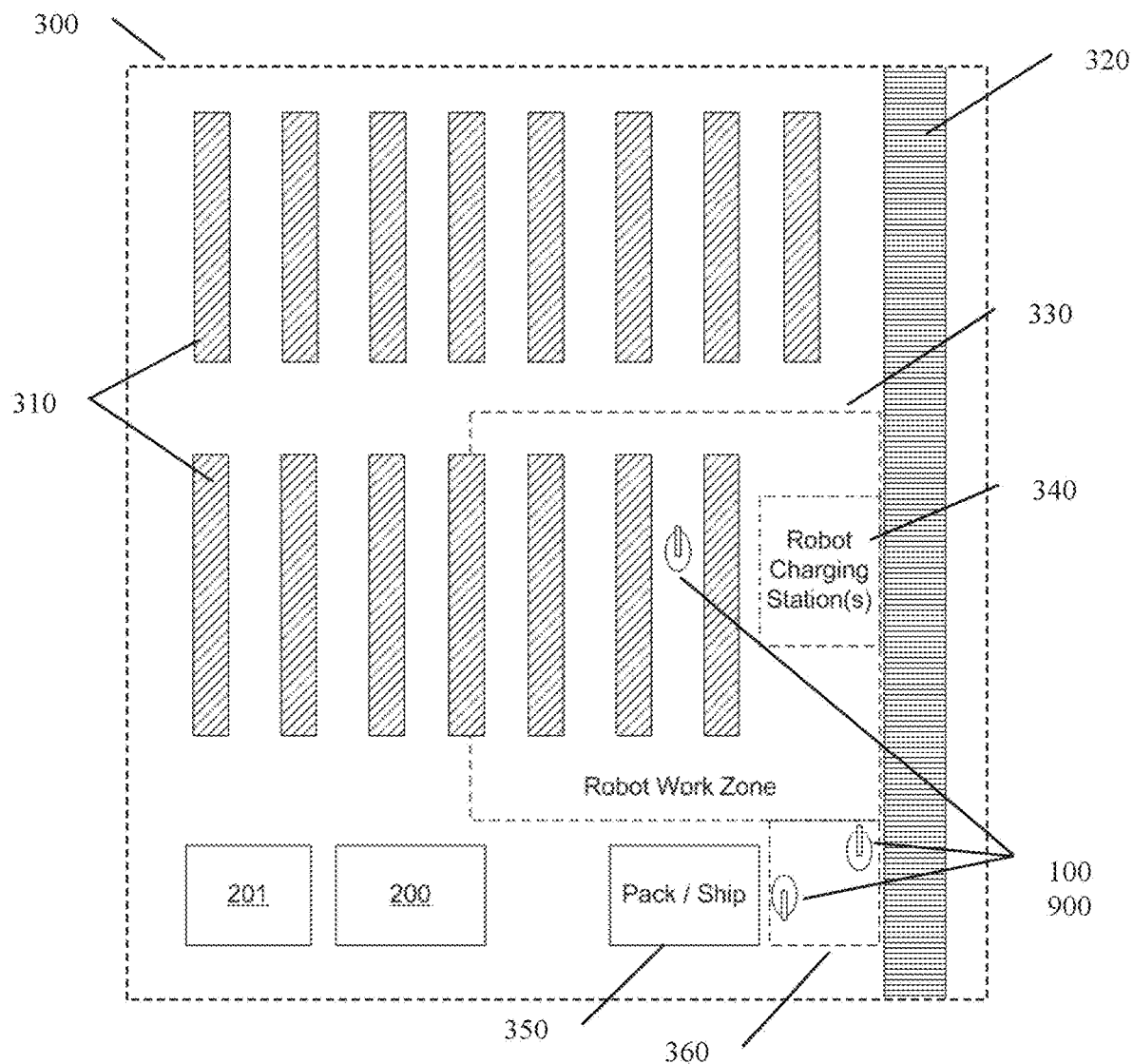
FIG. 11 illustrates a simplified overhead floor plan diagram of a representative logistics facility in accordance with certain aspects of the presently disclosed invention.

The transport robot 900 may move and navigate between locations in a work zone and an order transfer area (see 330 and 360, respectively of FIG. 11; 820, 830 of FIG. 8). During navigation, data from the various sensors (e.g., at least the exteroceptive sensors 924, 926, 919, and/or 922) may be processed by the onboard computer processor 978 in a navigation software module 972 to extract two modalities of information. The first modality may be local mapping information that indicates which areas around the transport robot 900 are traversable and which areas contain obstacles. The second modality may be visual or audible landmark locations, such as the visual landmark marker 420 locations shown in FIG. 12. Characteristics of the landmarks may be stored on the central server 200 or on the memory 976 of the robot (i.e., storage). When the characteristics of the landmarks are stored on the memory 976, the robot may navigate autonomously through a logistics facility and may not require constant communication from the central server 200.

As indicated above, the transport robot 900 may include a conveyance system on an upper surface of the transport platform 910, such as the roller bars 912 shown in FIG. 2. Control of the conveyance system, such as motion of the roller bars 912 in one direction or the other, may be included as a software module (conveyance module 974) that may be executed by the onboard computer processor 978 (see FIG. 10). This module 974 may control at least initiation, direction, and speed of the conveyance system. Such control may originate from signals received by the transport robot 900 (i.e., at the processor 978) from the various sensors of the transport robot 900 (e.g., cameras and infrared sensor pairs), or may originate as signal(s) sent from the central server 200, a warehouse management system (WMS, 201), a manipulation robot (100, 600), or from another transport robot, which are received by the communication interface 970 on the transport robot. Additionally, control of these functions of the conveyance system may originate with a human worker via wireless signals (i.e., through the communication interface 970) or manual selection (i.e., buttons or other human accessible interface on the transport robot 900).

The transport robot 900 may also have a user interface which includes a graphical display monitor and an input device (not shown), where the input device may be a touch screen, a track ball, voice command, a keyboard, input buttons or any combination of these devices and possibly others. The user interface may allow a user to command and control each transport robot 900 to perform localized tasks and to enter dispatch information manually, thus sending the robot on its mission.

Figure 16A:
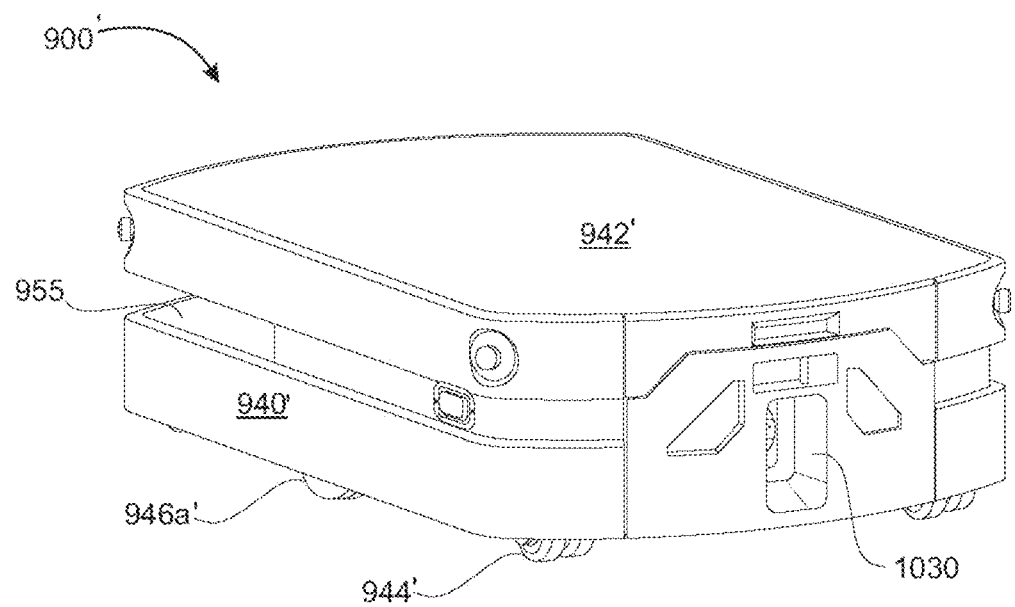
FIG. 16A illustrates a front perspective view of a transport robot base in accordance with certain aspects of the presently disclosed invention.

An alternative exemplary design for a transport robot is shown in FIGS. 16A-20. With reference to FIGS. 16A and 16B, the transport robot 900' may include a mobile base 940' having drive wheels (only one is labeled, 946a') and support wheel 954' (e.g., casters) as described hereinabove. The mobile base 940' may include a front and rear skirt or bumper (970a and 970b, respectively) that may be positioned to restrict items from the region under the mobile base (i.e., region where the drive wheels and support wheels reside), and one or more lights (917b'). as detailed hereinabove, these lights may be used to improve visibility conditions for the various sensors on the transport robot 900', may improve visibility conditions for other devices that may need to identify the transport robot, such as a manipulation robot (described in detail hereinbelow), and/or may improve visibility for human workers in the vicinity of the transport robot.

Figure 19:
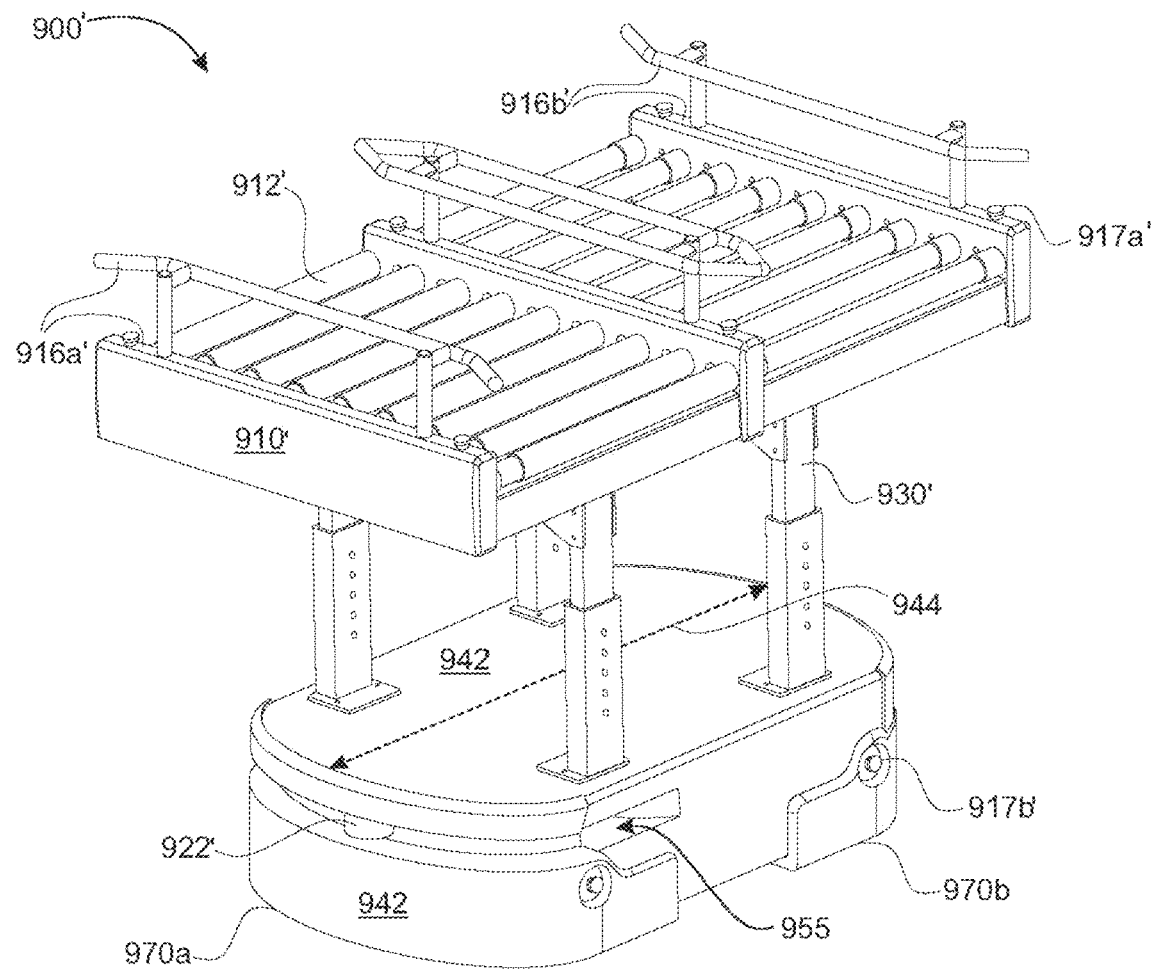
FIG. 19 illustrates a side perspective view of the transport robot base of FIG. 16A with a transport platform positioned thereon.

The transport robot 900' may further include a top surface 942' configured to support items, cases, or totes, and further configured to be customizable, such as by an end user, for a specific task or set of tasks. For example, as shown in FIG. 19, the top surface 942' of the mobile base 940' includes attachment arms 930' (four are shown) that may secure a transport platform 910' above the mobile base 940'. The custom transport platform 910' may include a conveyance system, such as the roller bars 912' shown, or any detailed hereinabove (e.g., conveyor belt). Moreover, the transport platform 910' may include front and back rims (916a and 916b, respectively) that may ensure proper placement of an item, bin, or tote on the conveyance system.

In this alternative design of the transport robot 900', one or more of the sensors may be positioned within a slot 955 located on a front side of the mobile base 940'. As shown in FIG. 16A, the slot 955 may be configured as a recess within the front portion of the mobile base 940', such as a recess extending from a front end 942 of the mobile base 940' to a point 0.3× to 0.5× the longitudinal length 944 of the mobile base 940' (see FIG. 19).

Figure 17:
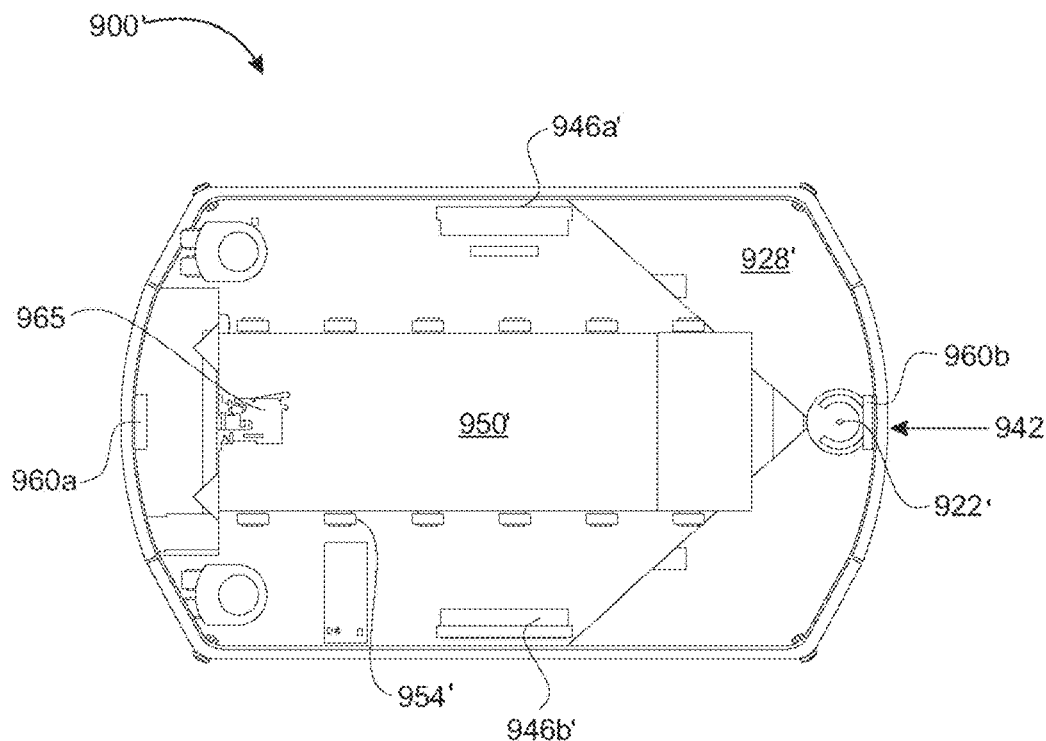
FIG. 17 illustrates a top view of internal components of the transport robot of FIG. 16A.

With reference to FIG. 17, a top view of the transport robot 900' is shown with a top cover removed so that internal details are apparent. A field replaceable battery 950' is shown engaged within a battery slot of the mobile base 940' and locked into position with an electronic latch 965. A position of the drive wheels (946a', 946b') is also shown. A laser ranging device 922' such as a LiDAR device is shown at a front end 942 of the mobile base 940' positioned within the slot 955. As configured, the slot 955 provides the laser ranging device 922' a 270-degree field of view (928') of the surrounding environment along a plane that is elevated from the ground.

Also shown in FIG. 17 are positions for additional sensors at the back and front (960a and 960b, respectively) of the mobile base 940'. Exemplary sensors include any of cameras, depth cameras, laser and/or LiDAR devices, radar, sonar, infrared, touch sensors such as whiskers or bump sensors, GPS, and proximity sensors. Exemplary cameras may include any of 3D or structured light depth cameras, stereo cameras, color cameras, grey scale cameras, and combinations thereof. According to certain aspects, the back and front (960a and 960b, respectively) sensors may be 3D depth cameras.

Figure 16B:
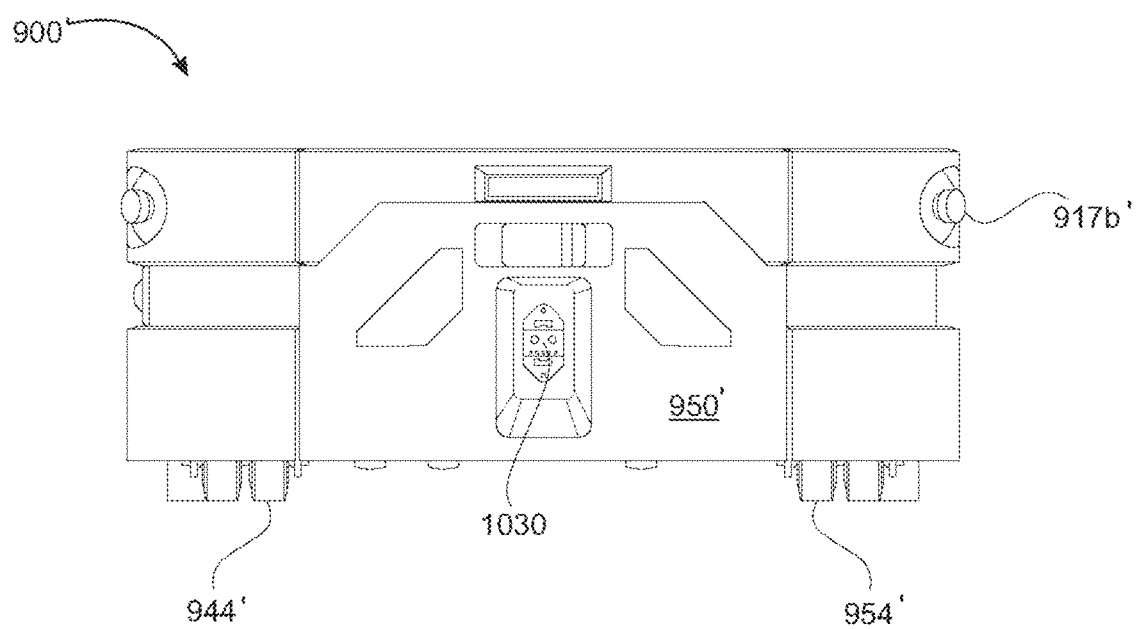
FIG. 16B illustrates a front view of the transport robot base of FIG. 16A.

All systems onboard the transport robot (900, 900') may be powered from onboard batteries, such as the field replaceable battery 950 housed within a cavity of the mobile base 940 shown in FIG. 3 or the field replaceable battery 950' housed within a cavity of the mobile base 940' shown in FIGS. 16A and 16B. The field replaceable battery (950, 950') may supply power to the robot during navigation for a limited time and may be rechargeable to maintain operation through an economically viable work period. Battery charging may occur opportunistically during times at which no work orders are present for the transport robot (900, 900'), or charging may occur separately from the transport robot (900, 900'). In this later case, the field replaceable battery (950, 950') may be swapped with separately charged batteries for continued operation of the transport robot (900, 900').

For opportunistic charging, the transport robot may have a charging station in a designated area of the facility 340 (see FIG. 11) in which the transport robot (e.g., 900 and other robots in the facility) can make temporary electrical contacts which feed power into the onboard batteries (i.e., field replaceable battery 950) while the robot is present. For separate charging, a battery hot-swap may be performed by using permanently installed smaller short-life (i.e., minutes) onboard batteries to maintain power while the larger field replaceable battery 950 is replaced with a fully charged field replaceable battery 950. This prevents the robot from needing to power down during battery swap, which saves time.

Hot-swapping may be done manually by a human operator, or may be done automatically such as with internal mechanisms of the transport robot and charging station that may automatically discharge/swap batteries at the charging station with the transport robot coordinating the procedure. That is, the transport robot may automatically discharge an exhausted field replaceable battery at an empty charging station, travel to a second charging station having a charged field replaceable battery thereon and load the charged field replaceable battery from that second charging station. The smaller, short-life batteries may provide sufficient power for each of these operations. Moreover, the smaller, short-life batteries may be recharged by the field replaceable battery during normal operation of the transport robot.

Additional signaling from the various charging stations that provide information regarding their status, e.g., presence or absence of a battery, and/or charge state of a battery on the charging station, may be provided to the central server 200 or the WMS 201. This information may be shared with each of the transport robots (e.g., 900, 900') and/or any other robots working in the logistics facility (e.g., 300, 700, 800 of FIGS. 11, 15, and 8, respectively).

Figure 18:
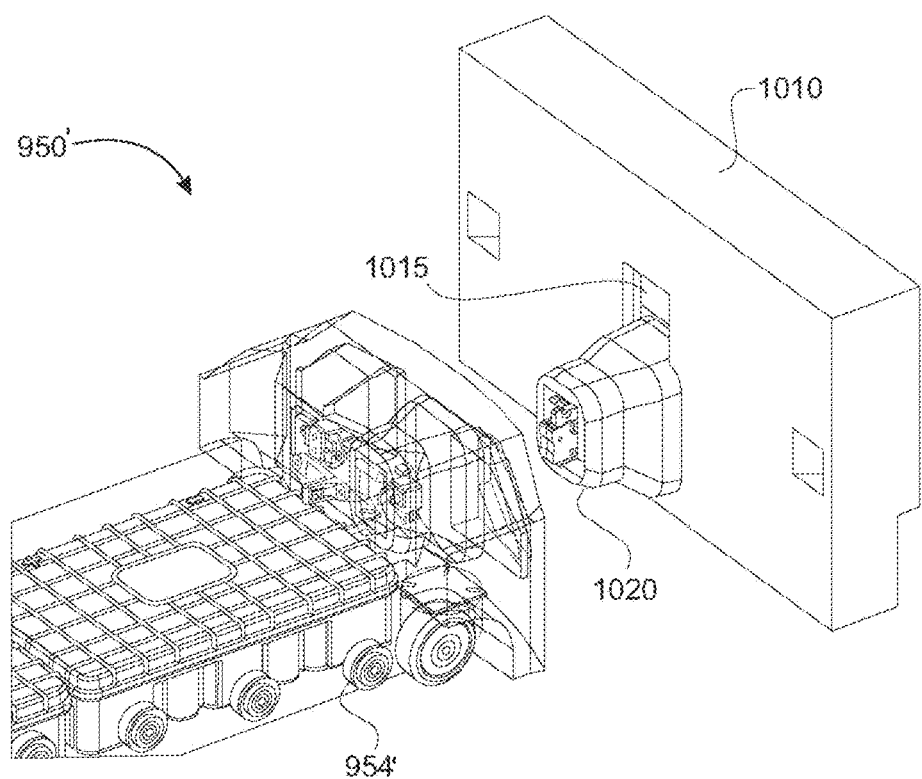
FIG. 18 illustrates a field replaceable battery docking with a docking station in accordance with certain aspects of the presently disclosed invention.

Charging of the field replaceable battery at the charging station may be wireless or may include direct contacts for interfacing with corresponding contacts (e.g. such as a charger pad or direct contacts) on the field replaceable battery. The contacts may be any suitable contacts such as spring loaded or other actuatable contacts that are configured to engage the contacts of the field replaceable battery when the battery is positioned substantially over or in front of the charging station. An exemplary design for the contacts between a field replaceable battery 950' and a charging station 1010 is shown in FIGS. 16B and 18. A contact 1020 of the charging station 1010 may be positioned so that a complementary contact 1030 of the field replaceable battery 950' may be pushed or moved into contact therewith by a human worker or a robot (i.e., any of the robots disclosed herein).

Figure 4A:
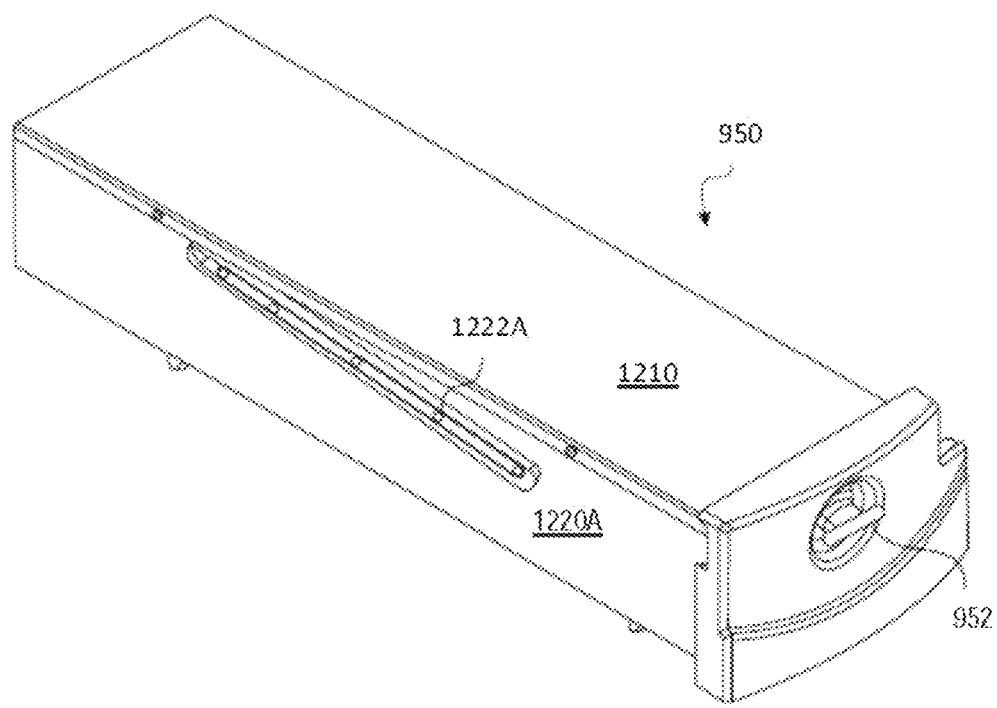
FIGS. 4A and 4B illustrate left and right side perspective views, respectively, of a field replaceable battery of the transport robot in accordance with certain aspects of the presently disclosed invention.
Figure 4B:
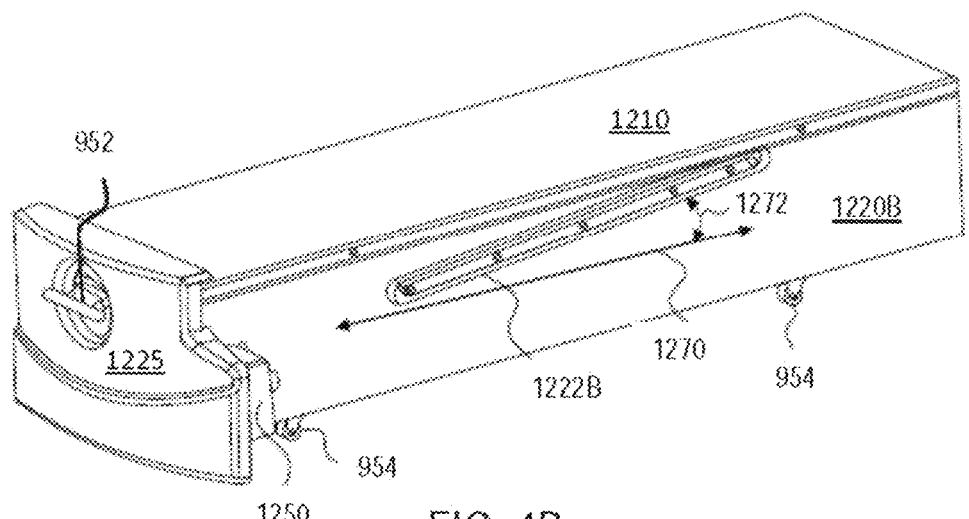

With reference to FIG. 3, an exemplary design and location for the field replaceable battery 950 in a transport robot 900 is shown, such as positioned within a cavity of the mobile base 940. As shown in FIGS. 4A and 4B, the field replaceable battery 950 may include a main body having a top side 1210, left and right side walls (1220A and 1220B, respectively), and front and back side walls. The top side 1210 may include a cover which may be opened to provide access to contents therein, such as at least one rechargeable battery cell. Exemplary rechargeable batteries include at least lithium ion batteries, such as rechargeable lithium iron phosphate batteries (e.g., 55V, 110 Amp).

Exemplary battery configurations are shown in U.S. Patent Publication No. 2018/0104829, the entire contents of which are incorporated by reference herein. These exemplary batteries, which are configured to provide sufficient power to the various robots disclosed herein, such as the transport robot 900 (and 900' of FIGS. 16A-20) and a manipulation robot 100 discussed hereinbelow, may weight in excess of 50 pounds. Accordingly, they would generally be too heavy for the average person to lift and/or maneuver. Thus, also provided on the main body may be a means to enable movement of the field replaceable battery. For example, as shown in FIG. 4B, wheels 954 such as fixed or rotatable casters may be attached to a bottom of the main body of the field replaceable battery 950.

The main body of the field replaceable battery 950 may further include at least one connection means for engaging with complementary connection means on the robot(s). For example, the main body may include at least one connection means on each of the left and right sides of the main body. Shown in FIG. 4A is a connection rail 1222A on the left side wall 1220A of the main body. Shown in FIG. 4B is a connection rail 1222B on the right side wall 1220B of the main body. Each connection rail is attached to the side of the main body at an angle 1272 that deviates from the longitudinal axis 1270 of the main body. That is, the connection rails (1220A, 1220B) extend upward from a front side wall 1225 to a back side wall of the main body with respect to the longitudinal axis thereof.

Figure 5:
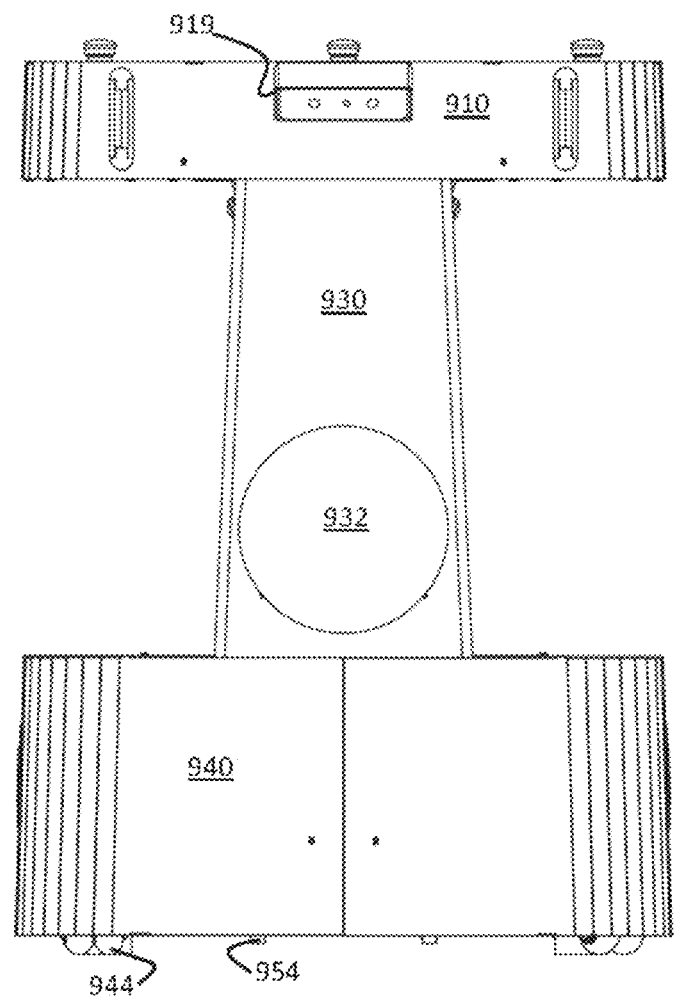
FIG. 5 illustrates a back view of the transport robot shown in FIG. 1.

The angle 1272 may be at least 5°, such as at least 6°, or 7°, or 8°, or 9°, or 10°, or 15°, or 20°, or 25°, or 30°, or 35°, or 40°, or 45°. In general, the angle would not exceed 45° as the force required to push the field replaceable battery into the cavity on the battery powered device is directly related to the angle 1272. That is, the connection rails provide a means to lift/elevate the field replaceable battery 950 into an engaged position on the battery powered device, e.g., transport robot 900. See for example the wheels (954, 954') of the field replaceable battery (950, 950') that are elevated relative to the drive wheels (946a, 946a') of the transport robot (900, 900') as shown in FIGS. 5 and 16B, respectively, when the battery is engaged and locked into the transport robot.

The specific position of these connection rails on the sides of the main body provide a means to connect the field replaceable battery with the transport robot and/or a manipulation robot (e.g., 100, 600 of FIGS. 9A and 14A, respectively having batteries 190 and 690) by engaging with complementary device connection means in a cavity of the robot. For example, the device connection means may be positioned on an inner right side and an inner left side of the cavity at a position complementary to the position of the battery connection rails (i.e., distance from the ground surface, angle, horizontal spacing, etc.). The field replaceable battery may be positioned (e.g., rolled on wheels 954) for connection by positioning a back side wall of the battery proximate to an open front of the cavity in the robot. The connection rails (1220A, 1220B) may engage a complementary connection means on each of the right and left sides of the cavity. Connection of the field replaceable battery to the robot is then achieved by pushing the battery into the cavity. The connection means on the outer side walls of the main body of the battery will engage with the connection means on the inner side walls of the cavity so that when the field replaceable battery is pushed into the cavity of the robot, the battery is lifted into the cavity with a bottom of the battery suspended above the ground surface (e.g., floor). In this way, the wheels (954) of the field replaceable battery are lifted/elevated off of the ground surface.

Once the field replaceable battery (950, 950') is fully inserted (pushed) into the cavity of the robot, an electrical connection may be established between the two via a connector. A preferred connector includes a blind mate connector on the field replaceable battery which may be configured to make an electrical connection with a blind mate connector on the robot. Shown in FIG. 4B is a blind mate connector 1250 on a back side of the front wall 1225 of the main body of the field replaceable battery 950. This blind mate connector is configured to engage a corresponding blind mate connector on the robot to electrically connect the at least one battery cell of the field replaceable battery 950 to power supply circuitry of the battery powered device (e.g., the manipulation robot) when the field replaceable battery 950 is installed in the cavity.

While the blind mate connector on each of the field replaceable battery and the robot are shown in a specific position, such as toward a front of the field replaceable battery and the cavity of the robot, other positions are possible and within the scope of the present invention. For example, the blind mate connectors may also be positioned toward a back of the cavity and on a back wall of the field replaceable battery or may be position on a top of the field replaceable battery and on an upper surface of the cavity of the robot.

As shown in FIGS. 4A and 4B, the field replaceable battery 950 may further include a locking handle 952 having a locked position and an unlocked position. For example, the locked position may be configured to lock the field replaceable battery 950 in an engaged position on the battery powered device. In the engaged position, the field replaceable battery 950 is fully pushed into the cavity of the robot and the blind mate connectors on each are connected to provide electrical connection between the two. The unlocked position of the handle may be configured to allowed movement of the field replaceable battery 950 within the cavity of the robot (e.g., insert or remove the battery from the cavity on the battery powered device).

Alternatively, and as shown in FIGS. 16A, 16B, and 18, the field replaceable battery 950' may not include an exterior handle but may rather be locked into position within the transport robot 900' by an electronic latch 965, such as a latch that may be activated (i.e., opened or closed) by the transport robot 900'. Such a configuration would enable autonomous exchange of discharged batteries for charged batteries by the transport robot 900'.

For example, the transport robot 900' may be configured to autonomously swap the field replaceable battery 950' when it is nearly or fully discharged at a charging station 1010 such as shown in FIG. 18. The transport robot 900' may receive signals from the field replaceable battery 950', such as from a charge sensor configured to sense a charge state of the battery (i.e., charge state of at least one battery cell). Upon receiving a signal indicative of a low charge state of the field replaceable battery 950', the transport robot 900' may proceed to an empty charging station 1010. Signals related to the status of various charging stations, i.e., occupied or empty, and of the field replaceable batteries 950' docked at any of the charging stations, may be communicated between the transport robot 900' and the central server 200 and/or WMS 201.

Once at an empty charging station 1010, the transport robot 900' may autonomously unlatch the electronic latch 965 so that the field replaceable battery 950' may be released from the transport robot 900' and slide into position on the charging station 1010. As shown in FIG. 18, the charging station 1010 includes a contact 1020, generally a male connector, that may engage with a complementary contact 1030, generally a female connector, on the field replaceable battery 950'.

The contact 1020 on the charging station 1010 may be configured to move vertically within a slot 1015 on the charging station. As indicated above, when a field replaceable battery 950' is engaged within a robot, it is elevated above the ground. As such, when a transport robot 900' approaches a charging station 1010, the contact 1020 may be elevated vertically to a position that best enables engagement with the complementary contact 1030 of the field replaceable battery 950'. Upon release of the electronic latch 965 by the transport robot 900', the field replaceable battery 950' may slide down and out of the transport robot while maintaining connection with the charging station contact 1020, which moves vertically down to match a position of the complementary contact 1030 on the battery.

The transport robot 900' may send/receive signals related to the status of this newly positioned field replaceable battery 950', such as proper alignment of the battery on the charging station and active charging of the battery. These signals may be sent from the field replaceable battery 950' and/or the charging station 1010 and may be received by the transport robot 900' and/or the central server 200 (and/or the WMS 201). In the case that improper alignment, connection, or charging are detected by the charging station 1010, further signals may be sent out by any of the transport robot 900', field replaceable battery 950', and/or charging station 1010 (i.e., those devices participating in the battery docking and charging activity) to summon a human worker to correct the error, or to cause the transport robot 900' to re-engage the field replaceable battery 950' and attempt to position the battery on the charging station again.

Thus, a standard autonomous hot-swap of a discharged battery may include signaling between a transport robot 900' and the central server 200 and/or WMS 201 to locate an empty charging station 1010, traveling to that charging station, and docking the complementary contact 1030 of the field replaceable battery 950' with a contact 1020 of the charging station 1010. The transport robot 900' may then send/receive signals, as detailed above, regarding a successful docking action at the charging station 1010, and upon a successful docking action, may unlatch the electronic latch 965 to discharge the field replaceable battery 950' from the internal cavity of the transport robot 900' so that the robot may move away from the charging station.

The transport robot 900' may send/receive signals from any of a charging station having a charged battery, the central sever 200, and/or the WMS 201 regarding location and charge status of a field replaceable battery 950' that may be used to replace the recently discharged battery. Upon locating a suitable replacement battery, the transport robot 900' may proceed to that charging station 1010 and drive over/engage the replacement battery within the internal cavity. Once engaged properly within the internal cavity (i.e., connected so that the battery may provide power to the transport robot 900'), the transport robot 900 may re-engage the electronic latch 965 to secure the battery therein. The robot may exit the charging station and proceed with previous duties (pick/put-away, etc.).

The field replaceable battery generally includes at least one rechargeable battery cell. Further, the field replaceable battery may include a charge sensor configured to sense a charge state of the at least one battery cell, and a circuit electrically connected to the charge sensor for receiving a signal indicative of the charge state of the at least one battery cell. Additional sensors may be included which register a temperature, voltage, current, etc. of the at least one battery, and such information (data) may also be relayed via a circuit. Additionally, when more than one battery cell is included in the field replaceable battery, each individual battery may include a charge sensor (and optionally additional sensors), which may communication via individual circuits, or may communicate directly, to a battery management system. Such a system manages a rechargeable battery (cell or group of cells), such as by protecting the battery from operating outside its safe operating area, temperature, voltage, etc.; and by monitoring its state, calculating secondary data, reporting that data, controlling its environment, authenticating it and/or balancing the usage of individual cells in a groups of cells.

The field replaceable battery may be part of a power management system that may also include a backup battery to provide power to the robot when the field replaceable battery is removed or fully discharged. Moreover, the power management system may include a battery docking station, such as the charging station 340 and/or 1010 (FIG. 11, 18 respectively) previously discussed, and/or AC plug. In additional to specific signals sent from the field replaceable battery to the robot and/or remote server, the field replaceable battery may also indicate a charge status on a visible face of the main body of the battery either through one or more lights or a visible readout. Alternatively, or additionally, the field replaceable battery may indicate the charge status by an audible signal that may change (e.g., start at a certain charge state, grow louder and/or increase frequency of signal, etc.) as the battery is progressively discharged. Moreover, the field replaceable battery may be configured with both an electronic latch 965 and a locking handle 952 that enable either or both of electronic and manual connection/disconnection of the battery with a robot.

Figure 12:
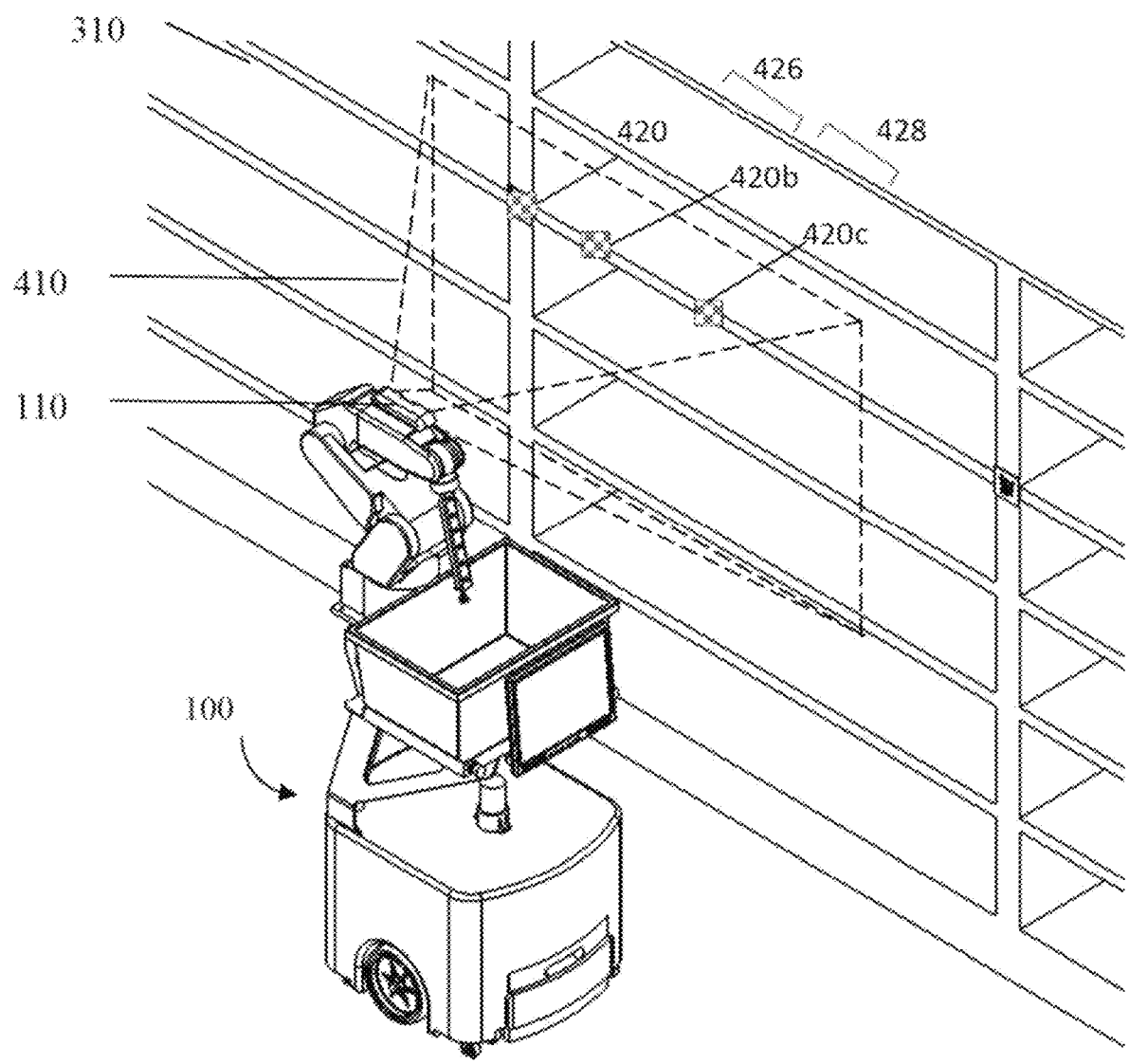
FIG. 12 illustrates a diagram depicting a manipulation robot navigation using visual landmark location markers in accordance with certain aspects of the presently disclosed invention.
Figure 14A:
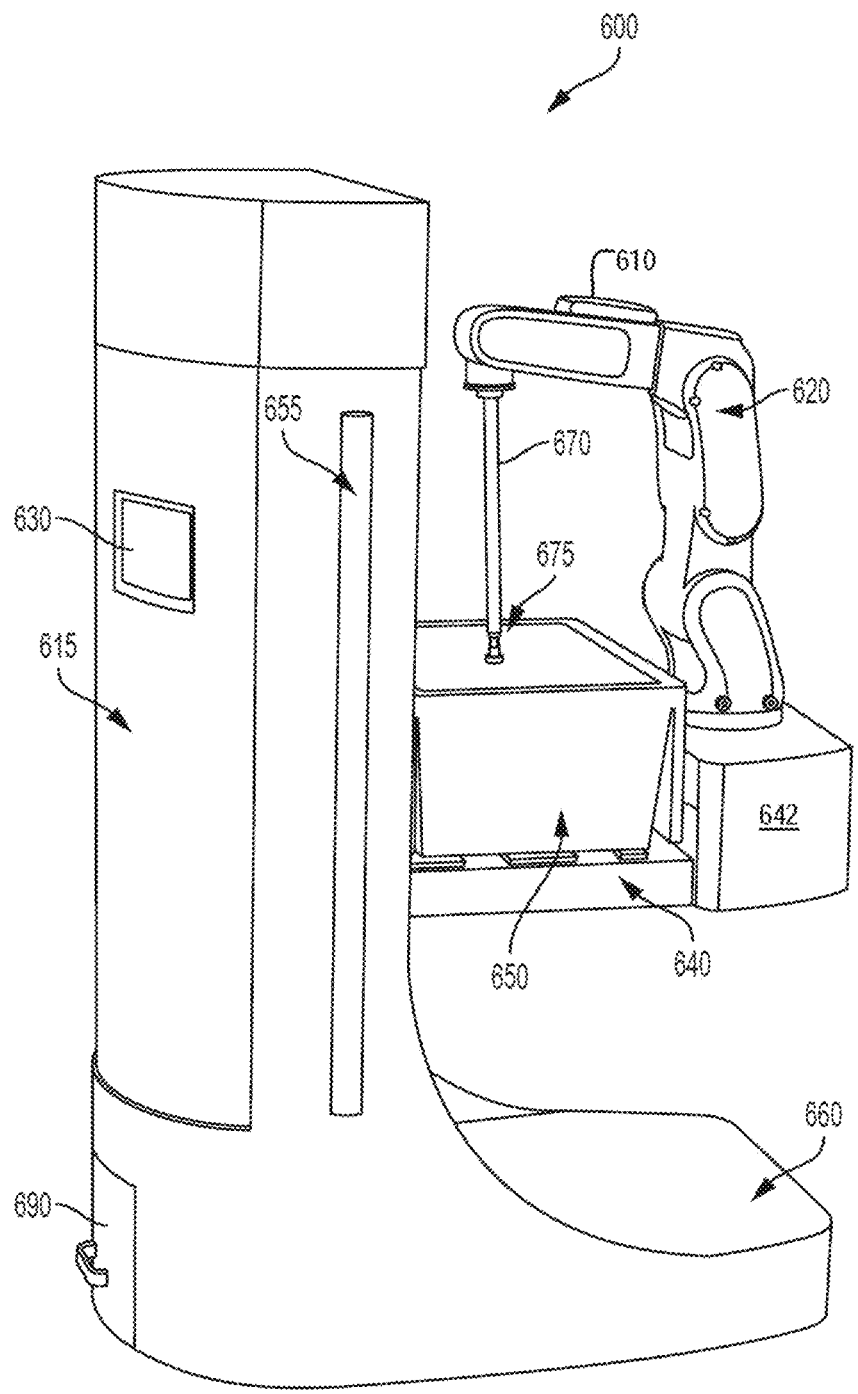
FIG. 14A illustrates a rear perspective view of a manipulation robot in accordance with certain aspects of the presently disclosed invention.
Figure 14B:
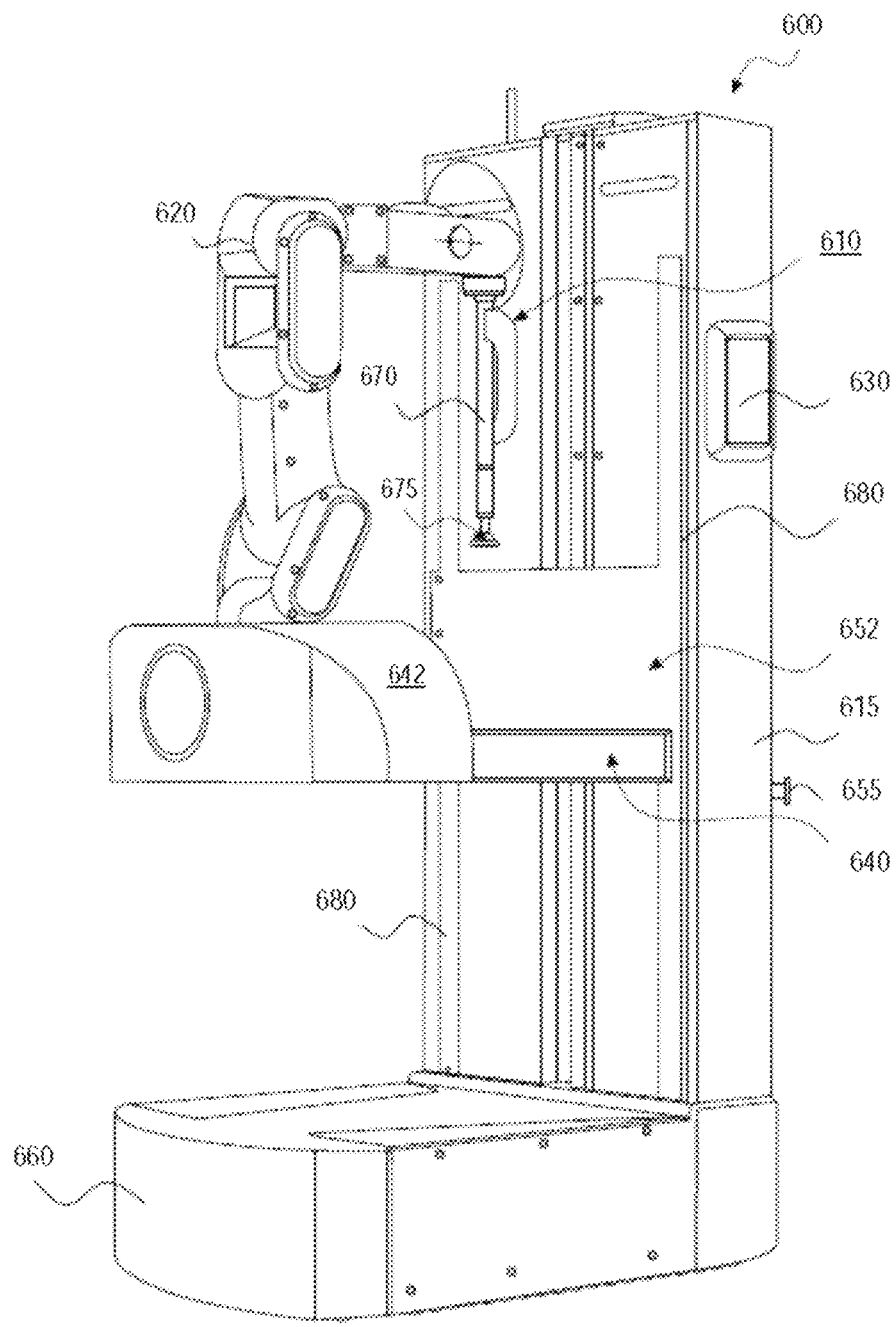
FIG. 14B illustrates a front perspective view of a manipulation robot in accordance with certain aspects of the presently disclosed invention.

As shown in FIG. 10, the transport robot (900, 900') may be part of a system that includes additional robots, a central server 200, and/or a warehouse management system (WMS, 201). The other robots may include manipulation robots 100, as shown in FIGS. 9A, 9B, and 12, or manipulation robots 600, as shown in FIGS. 14A and 14B.

The system may utilize these manipulation robots (e.g., 100, 600) for picking or put-away of individual items, bins, or cases to/from at least (1) a platform on the transport robot, (2) a storage location within the logistics facility, (3) a conveyance means within the logistics facility, or (4) to a human worker. Such manipulation robots are generally more complex and expensive than the transport robots (900, 900') detailed herein. As such, use of these manipulation robots to transport items, bins, or cases over long distances may not be the most economic and efficient means for supply chain and logistics automation. Rather, according to certain aspects of the presently disclosed invention, the manipulation robots may transfer items, bins, or totes to a transport robot (900, 900') for lower cost, more efficient transport to a packing or staging area. The manipulation robots may then spend more time in picking/put-away operations, increasing overall efficiency and thus reducing both up-front and long-term costs of the automation.

Figures 9A, 9B:
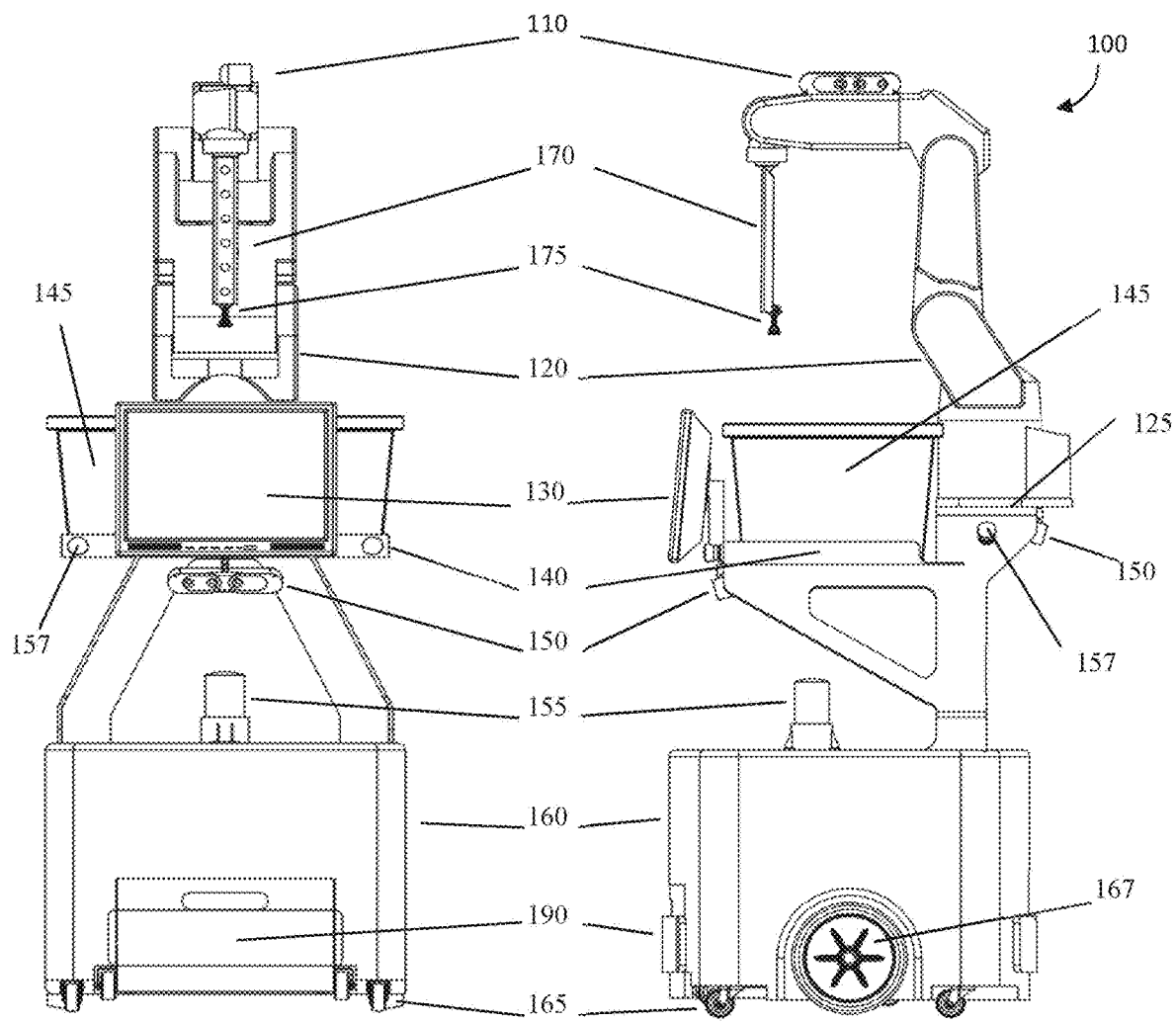
FIGS. 9A and 9B illustrate front and side views, respectively, of an autonomous mobile manipulation robot (AMMR) or manipulation robot in accordance with certain aspects of the presently disclosed invention.

An exemplary manipulation robot is shown in FIGS. 9A and 9B, which illustrate front and side views of one of a plurality of manipulation robots 100 that can be used within the system. Internal details of components and software relevant to the system are shown in FIG. 10, which provides a block diagram of a system comprising a central server 200, at least one manipulation robot (100, 600), and at least one transport robot (900, 900'). Note that reference to a transport robot may include any of the configurations detailed herein, such as the transport robot 900 of FIG. 1 and/or the transport robot 900' of FIG. 16A or 18, unless specifically indicated otherwise. Moreover, reference to a manipulation robot may include any of the configurations detailed herein, such as the manipulation robot 100 of FIGS. 9A, 9B, and 12, and/or the manipulation robot 600 of FIG. 14A or 14B, unless specifically indicated otherwise.

The server may have an electronic communications interface (server communication interface 240) that connects with an electronics communication interface on the manipulation robot(s) (remote communication interface 210) and the transport robot(s) (remote communication interface 970). This connection may be established through a wireless network via a wireless access point. Various other types of communication are possible and may be used in addition to, or as an alternative to wireless communication, such as a tethered wire connection or other point-to-point wireless data exchange.

As shown in FIGS. 9A, 9B, 12, and 10 the individual manipulation robots 100 may have a wheeled mobile base 160, internal batteries 190 (such as field replaceable battery 950 detailed hereinabove), and an onboard computer processor 218 with memory storage 216. The manipulation robots may also have at least one temporary storage bed 140 for picked items and at least one robotic manipulator arm 120. The onboard computer processor 218 may be configured to run a set of programs with algorithms capable of performing navigation and picking. Further, the onboard computer processor 218 utilizes data from sensors (150, 110) to output control signals to the mobile base 160 and manipulator arm 120 for navigation and picking, respectively.

As mentioned above, the onboard computer processor 218 may also have local persistent memory 216 which stores specific information relevant to the configuration of each manipulation robot. Such information may include sensor calibration data, actuator tuning parameters, and other platform specific data. The onboard computer processor 218 may also communicate with the central server 200 to receive pick order information and respond back with confirmation data to inform the central server 200 of successful picks or any errors that might occur.

Each manipulation robot may also have a user interface 130 which includes a graphical display monitor and an input device, where the input device may be a touch screen 130, a track ball, voice command, a keyboard, input buttons or any combination of these devices and possibly others. The user interface 130 allows a user to command and control each manipulation robot to perform localized tasks and to enter product picking dispatch information manually, thus sending the robot on its mission.

Figure 13A:
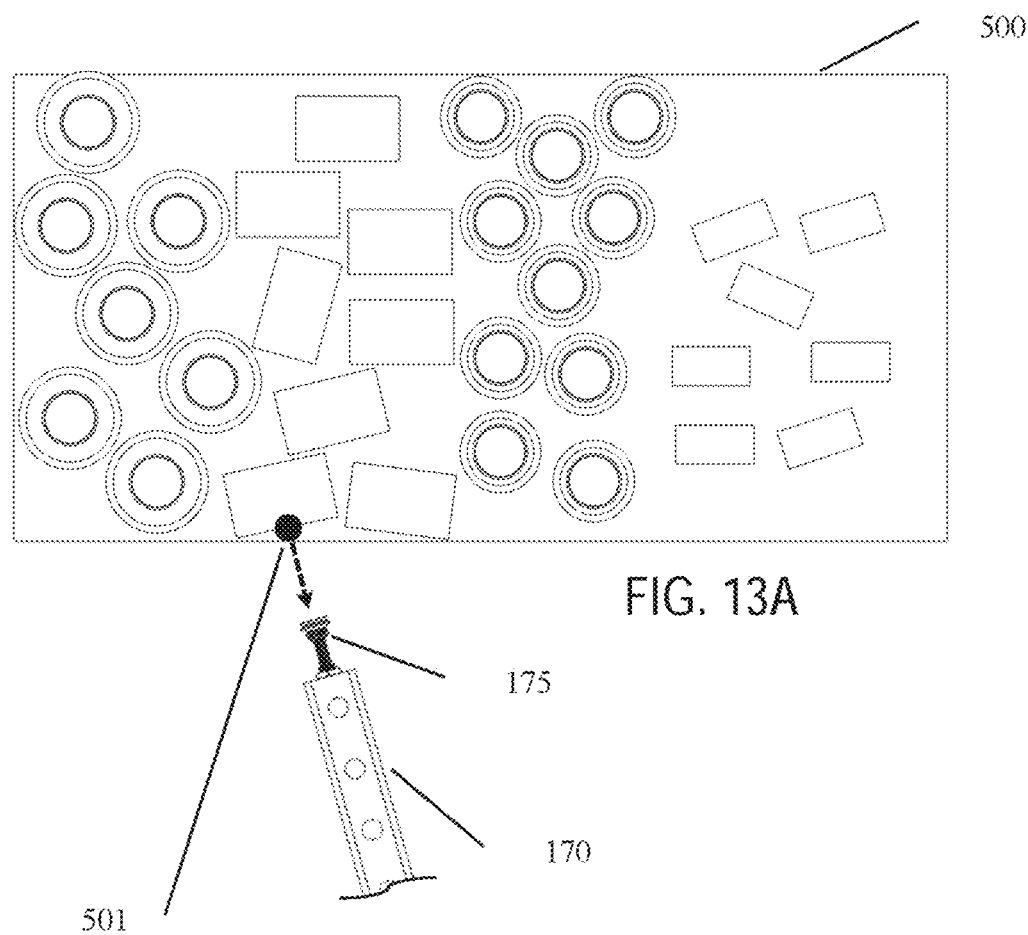
FIGS. 13A and 13B illustrate top and front views of a pick location with example items, grasp positions and vectors in accordance with certain aspects of the presently disclosed invention.
Figure 13B:
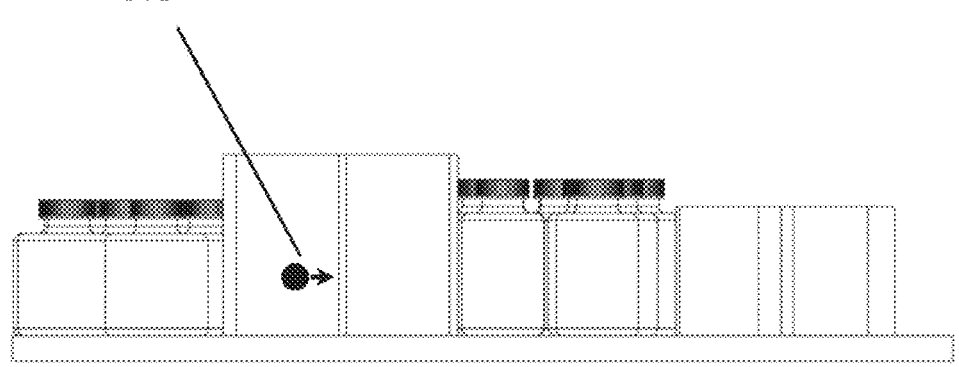

A robot manipulator arm 120 is used in the presently disclosed system to pick items with the common variability found in item size, shape, weight and placement within a logistics facility. An exemplary representative drawing of such variability is shown in FIGS. 13A and 13B, which are the top and front views, respectively, of a stocked shelf 500. Common logistics storage infrastructure, such as an ordinary shelf or rack 500, does not constrain any item location and orientation for the purposes of any deliberate accuracy, therefore, in order for a robot to do a pick at random it must have sufficient freedom to grasp an item in various configurations. As such, a high degree-of-freedom robot manipulator arm 120 provides the manipulability necessary to pick an item in any configuration in which it is found. The presently disclosed systems and methods are further capable of picking individual items from within a bin, where the items may be positioned in any orientation, and may even be partially covered by other items within the bin.

The manipulation robot may physically adjust for variations in item location and orientation which may be determined from sensor 110 information prior to the pick. The manipulator arm 120 may be mounted to the robot frame 125 at a position on top of the mobile base 160 of the manipulation robot 100. The manipulator arm 120 enables the robot to reach multiple shelf level heights. The vertical reach of a robot may be extended, for example, by mounting the manipulator arm 120 on a vertical actuator stage. The vertical actuator stage would be able to raise and lower the manipulator arm 120 so an end effector 175 can reach both higher and lower pick locations. According to the present invention, additional high degree-of-freedom robot manipulator arms 120 may be included which may provide additional lift capability to pick objects of various shapes and sizes when the arms work cooperatively, or to pick more than one object at a given pick location using arms working in parallel but independently. For multi-arm robots, the arms may be the same or may have different kinematic configurations and may have the same or may have different end effectors.

The present robot system uses a grasping end effector 175 on the manipulator arm 120 to pick items, bins, or cases from their stored location and transfer them to a temporary location, or vice-versa. The grasping end effector 175 may be a suction cup, which may be connected to a vacuum pump through an onboard computer processor 218 controlled valve. The vacuum suction at the suction cup may be engaged and disengaged by actuating the valve, thereby allowing the manipulation robot to grasp the desired pick item on contact and then release it when necessary. The use of a suction cup also allows the robot to grasp a target item at a single point and orientation, which reduces the computation time required for the system to determine how to grasp the pick item.

Alternatively, the end effector may be a mechanically actuated gripper such as, for example, a robotic hand having articulated digits. The end effector may be a simple gripper, an electroadhesion end effector, a magnetic end effector, or combinations thereof, and the robots may comprise an end effector swap mechanism configured to permit a change of the end effector. Exemplary magnetic end effectors may utilize electromagnets, permanent magnets, or magnet arrays which provide opposing magnetic fields. An electroadhesive end effector may use reversible electrostatic adhesion to grip an item while it is picked and put. When an electroadhesive or magnetic end effector is used, such may be powered by an electrical power supply configured to generate an electrostatic or magnetic adhesive force that is used to releasably adhere the item to the end effector. The onboard computer processor 218 (see FIG. 10) may control the power supply to activate and deactivate the electrostatic or magnetic adhesive force of the end effector.

The decision to use of one, various interchanged, or a combination of end effector technologies is driven by the physical properties of the objects to be grasped so that a sufficient amount of lift force is generated to carry the objects by the manipulator arm without causing damage or visible alterations to the objects.

The presently disclosed system design may also include an extension tool 170 mounted at the end of the robot manipulator arm 120, as shown in FIGS. 9B and 13A, 13B. This tool 170 may enable the manipulation robot 100 to position the grasping end effector 175 at a sufficient depth into a storage rack so that the end effector may reach a desired item while maintaining clearance for the manipulator arm 120 (i.e., so that the manipulator arm does not come into contact with the infrastructure). It may also enable the end effector 175 to reach into shelf corners where it would otherwise not have clearance for the robot manipulator arm 120. The extension tool 170 may be sized based on specifics of the logistics facility such as, for example, shelf depth. That is, the extension tool 170 may be long enough to reach into the back of a shelf, as mentioned above, so that the end effector 175 may pick an item placed therein. Furthermore, the extension tool 170 may have a diameter that is smaller than the diameter of the end effector 175. This may allow the extension tool 170 to reach into a shelf without obstructing the view of the end effector 175 and/or the item to be picked, and may simplify the computation required to locate the item as no additional sensor information may be required to locate the extension tool; information regarding the end effector 175 would be sufficient.

The extension tool 170 may be a replaceable or switchable part of the robot manipulator arm 120. In this way, logistics facilities having different configurations such as, for example, deeper shelving, may be accommodated by simply switching out the extension tool 170 to one more suited for the work (e.g. a longer extension tool). Furthermore, in cases where an end effector 175 may require a different connection mechanism, the use of various extension tools 170 having different connection mechanisms at the end used for connection to the end effector 175, may streamline switching an end effector 175 on the robot manipulator arm 120. That is, the ability to switch out the extension tool 170 to one having a suitable connection means for the desired end effector 175 may improve the ease of use of the manipulation robot.

After items are picked, they may be placed into the storage bed 140 for transportation. The bed may also carry a container 145, such as a bin or tote, in which the items can be placed. This method enables multiple items to be picked for a given order or batch of orders. This method frees the robot manipulator arm 120 to pick additional items without needing to take multiple trips to and from an order transfer area 360 (See FIG. 11). Additionally, by carrying a packing box, bin, container, or transport tote 145 onboard, the manipulation robot 100 is able to aggregate order items together into a single container that can be easily swapped with a different container for additional order fulfillment, such as by transferring the tote 145 to the transport platform 910 of a transport robot 900.

While each of the aforementioned actions of the manipulator arm and end effector, and optional extension tool, are discussed with respect to picking an item from a shelf, the robotic devices, systems, and methods disclosed herein may also be useful for picking bins, totes, or cases from a shelf, or from another robot (i.e., any of the transport robots, manipulation robots, conveyance systems, etc.). Moreover, the picking of individual items is discussed with reference to FIGS. 13A and 13B, wherein the items are stored openly on shelving. The present systems and methods envision picking of items that may be stored as multiples of items, e.g., multipacks, and/or may be stored in any configuration within bins, i.e., individually, as multiples, mixed with other items in a bin, etc.

According to the presently disclosed invention, at least one sensor 110 may be positioned at a point on the at least one manipulator arm 120 such that rotation of the arm directs the at least one sensor toward the item, bin, or case to be picked for identification and localization. Positioned opposite the at least one sensor 110 may be at least one opposite sensor that is mounted such that once the manipulator arm 120 angles itself to pick the product, the opposite sensor is now aimed directly into the storage bed 140 or transport tote 145 where the product is to be placed. This opposite sensor may provide the data necessary to allow the onboard computer processor 218 (see FIG. 10) to analyze the storage bed 140 or transport tote 145 to find the optimal location to place the product, considering that there might be previous objects already container thereon. Additionally, with two such sensors 110 aimed in opposite directions, the system may be able to pick from the left or the right side of the manipulation robot 100 based on product location.

Thus, at least one sensor on the manipulation robot, typically on the manipulator arm, provides signals related to detection, identification, and location of the at least one item, tote, or case to be picked or put-away, and one or more processors on the manipulation robot analyze the signals to generate arm control signals to guide the end effector of the manipulator arm to pick or put-away the item, tote, or case with a collision free path throughout a controlled motion of the manipulator arm. For individual items, the arm control signals may guide the end effector of the manipulator arm to pick or put-away the item stored individually on a shelf or stored within a bin, such as with other similar or dissimilar items in the bin.

According to the presently disclosed invention, the storage bed 140 may comprise a calibration target which may be viewed by one or more of the sensors 110 on the mobile manipulator arm 120 (see FIG. 9A, 9B). These sensors 110 may be positioned to view the calibration target on the storage bed 140 when the mobile manipulator arm is rotated. According to certain aspects, the sensors 110 may be positioned at a central location on the manipulator arm 120. As such, information on the calibration target may be used to calibrate these sensors 110 to ensure that all parameters are within specifications, and if not, update the parameters to reflect the current configuration. The dual use of the storage bed 140—as a platform to hold picked items and as a calibration target—reduces the size profile of the presently disclosed manipulation robot and improves the accuracy of the system.

The specific location of one or more sensors 110 on the mobile manipulator arm 120, such as shown in FIG. 9A (see also sensors 610 of FIGS. 14A and 14B), allows for improved picking accuracy. First, these sensors 110 will have an unobstructed and enlarged view of the items to be picked and their storage locations, which is improved over the view that is provided by sensors placed at the end of a robotic arm or on the mobile base, as is the case in many prior art systems. Furthermore, sensors mounted at the end of a robotic arm may get in the way of, or reduce the range of positions available to, an end effector; sensors mounted on the mobile base may have their view of the items to be picked and their storage locations impeded by movement of the robotic arm.

Second, the specific location of the one or more sensors 110 on the mobile manipulator arm 120 provides improved measurement accuracy of the item to be picked. The high degree of freedom mobile manipulator arm 120 may move and articulate at more than one point along the arm, and each movement introduces potential error to any measurements that may be made between the end effector 175 and the items to be picked by sensors positioned on the mobile base 160. Placement of the sensors 110 at a central location may reduce this error by bringing the sensors 110 closer to the items to be picked, and thus removing the error inherent in several points of articulation.

The transport robot (900, 900') and/or manipulation robot (100, 600) may also be equipped with safety features which can include: one or more safety lights or strobes (917a, 917a', 917b, or 917b', and 155, respectively), an audible warning annunciator or horn, one or more emergency stop buttons (915a or 915b, and 157, respectively), the ability to display fault, error and/or intended action (such as navigation turn signal) information on the user interface 130 or at some other point on the robot, or any combination thereof.

The safety features of any of the robots disclosed herein may include a health monitor module on the robot processor/memory that may receive signals from the various sensors and may communicate a fault or error state to a remote server. As example, the health monitor may register a power loss, or obstacle, or sensor failure and may communicate this information to the remote server. The robotic health monitor may cause the robot to stop, slow movement, signal an audible or visual error state, or change routes, or after receiving signals from the robot regarding an error or fault state, the remote server may cause any of these actions. Certain limits may be dynamically set for the robots depending on the logistics facility and/or specific job requirements of the robot. For example, in facilities where human workers may work side-by-side with the robots of the present invention, the distance limits at which an object is registered as an obstacle may be set to avoid accidental contact with a human, or the robot may be configured to slow when approaching a human worker. Additionally, should an error be registered at the remote server for a robot, a human worker may be dispatched to clear the error (e.g., move an obstacle).

The transport robot (900, 900') and/or manipulation robot (100, 600) may contain an external swappable memory port on a side, where necessary information may be uploaded to the robot directly when the operator inserts a data storage device, thus by-passing the wireless communication to the server. The data storage device may be a disk, USB flash device, or other form of external memory storage device. The data may also be transferred through proximity communication technologies, such as near field communication (NFC), Bluetooth, or short-range radio-frequency identification (RFID) standards.

Furthermore, each transport robot (900, 900') and/or manipulation robot (100, 600) may be configured to receive signals from the central server 200, or directly from the WMS 201, which may indicate an emergency and may direct the robot to stop and/or may further activate the one or more safety lights or strobes and/or audible warning annunciator or horn. In the event that an unstable and/or unsafe diagnostic state for the robot is detected by the one or more robot processors (i.e., 978 or 218), the robot may be stopped. The transport robot (900, 900') and/or manipulation robot (100, 600) may also be stopped if the sensors detect a human or obstacle in close proximity or detect unsafe operation of the robot. Such signals may be processes at the central server 200 which may then control the robot speed and or direction of operation.

The transport robot (900, 900') and/or manipulation robot (100, 600) may also send signals back to the central server 200, the WMS 201, or to other robots regarding conditions in a navigation pathway (e.g., obstacles, unsafe conditions), a condition of the robot (e.g., unstable and/or unsafe diagnostic state, load state, status of the work order, battery charge state), or a condition of the inventory or warehouse (e.g., no item at pick location, inventory status).

Figure 15:
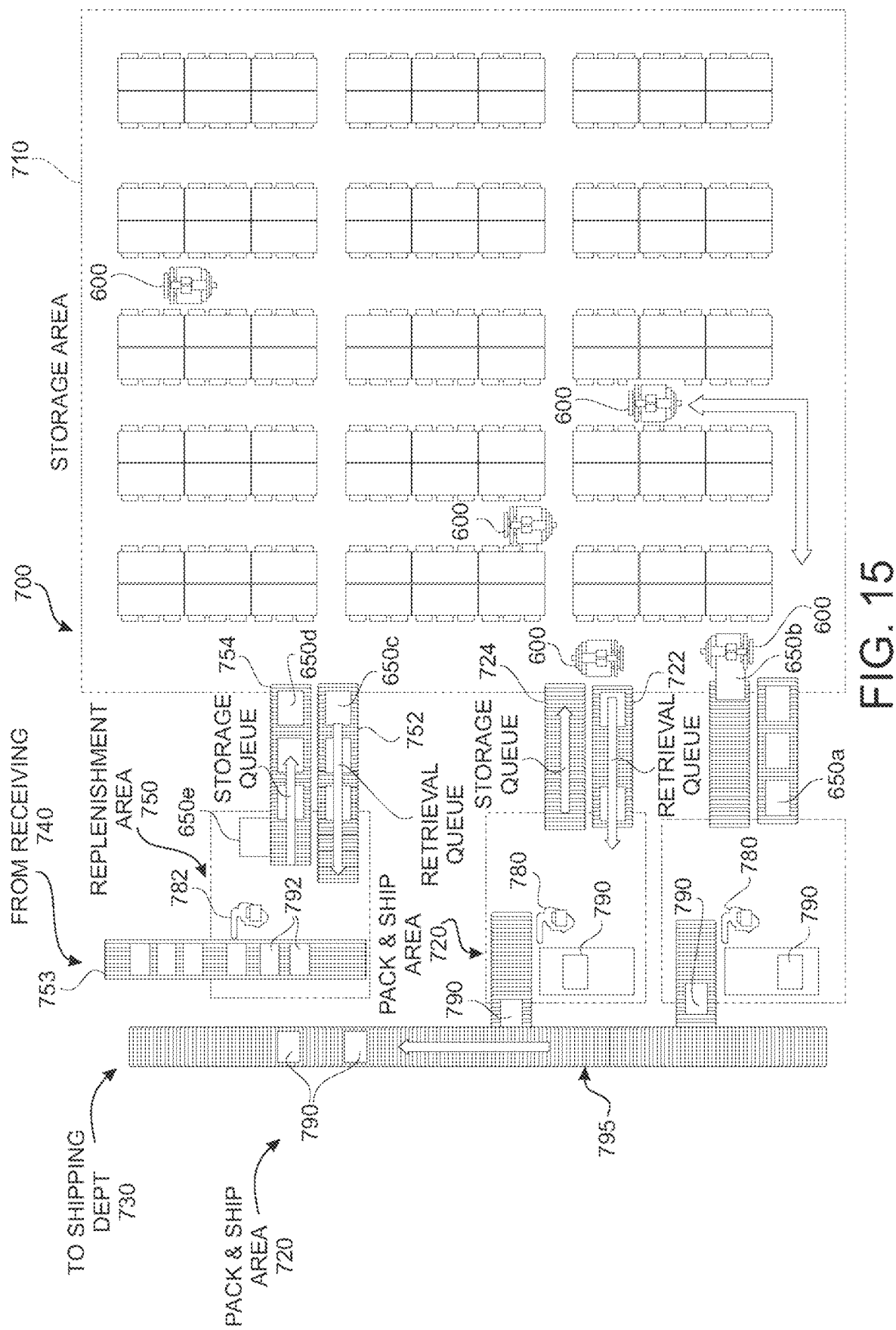
FIG. 15 illustrates a simplified overhead floor plan diagram of a representative logistics facility.

FIGS. 8, 11, and 15 show exemplary top view floor plans of a section of a logistics facility (800, 300, and 700, respectively) in which the transport robot (900, 900') and/or manipulation robot (100, 600) may be deployed. The presently disclosed system(s) and method(s) enable items, totes, or bins to be picked by a manipulation robot (100, 600) and transferred to any of a transport robot (900, 900'), a packing and shipping station 350, or a conveyor 320 or a staging area 360. The transport robot 900 may accept items, totes, or bins from any of a manipulation robot 100, another transport robot 900, a shipping station 350, a human worker, or a conveyor 320 or a staging area, and may deliver the items, totes, or bins to any of the same.

According to certain aspects of the presently disclosed invention, various work zones may be defined within a logistics facility. For example, and with specific reference to FIG. 8, a logistics facility 800 may include zones that are robot specific work zones where human workers are excluded 830, zones where humans and robots may work side-by-side 820, and human-only work zones where robots are substantially or totally excluded 810. While shown in FIG. 8 to include entire rows of shelving units 840, these zones may be setup in any user defined manner, such that portions of shelving or storage rows or even individual units may include two or more work zones.

These various work zones may be mapped using granular information, such as 1D bar codes placed on ends of racks, or may be mapped in a more defined manner, such as using identifiers that define specific regions of interest (e.g., individual racks in a row of racks; described in more detail hereinbelow).

Selection of these work zones may be dynamic. That is, the various work zones may be defined/redefined at any point during operation of the system from either the central server 200 or the WMS 201. In certain instances, signals may be communicated to the central server 200 or the WMS 201 regarding a new limitation or definition of the work zones, such as from any of the robots (100, 600, 900). For example, in the case of a human accident or emergency, it may be necessary to exclude robots from a specific area of a logistics facility. Robots in the area may send information regarding the emergency (i.e., emergency signals initiated by the robot or by a human worker, or sensor information that may be interpreted at a distal location to indicate an emergency).

As shown in zone 830, manipulation robots 874 may pick items, totes, or bins from standard shelving 840 and may transport those picks to a different zone within the logistics facility, such as to a conveyor or a pack/ship zone (see 320 and 360 of FIG. 11). The manipulation robots 873 may pick items, totes, or bins and may transfer those items to a transport robot 868. The transport robot 868 may then travel to a different location to deliver the item. Exemplary locations include a conveyor or a pack/ship zone (see 320 and 360 of FIG. 11). Alternatively, the transport robot 868 may transfer the items to another transport robot 867 for delivery to any of those locations.

The manipulation robots (100, 600) may recognize the transport robots 900 during operation by a visual or audible code of the transport robot. For example, the transport robot may include a barcode on an outside surface that can be read by the manipulation robot, thus identifying the correct transport robot.

With continued reference to FIG. 8, the systems of the presently disclosed invention may also work side-by-side with human workers in a mixed work zone 820. For example, human workers (853, 854) may pick items and transport those items to a conveyor or a pack/ship zone, or to a transport robot (866, 864), or to a manipulation robot 871. Manipulation robots 872 may also pick items, totes, or bins from standard shelving 840 and may transfer those items to transport robots 865. As indicated above, the transport robots 865 may then travel to a different location, such as a conveyor or a pack/ship zone (see 320 and 360 of FIG. 11) to deliver the items, or may transfer the items to another transport robot (866, 862) for delivery to any of those locations.

Within the same logistics facility, human only work zones 810 may be established where robots are substantially or totally excluded. Human pick workers 851 may select items for transport to a conveyor or a pack/ship zone (see 320 and 360 of FIG. 11). According to certain aspects, transport robots (861, 863) may be allowed in these zones (810) to accept items, totes, or bins from the human workers 852. These transport robots (861, 863) may then travel to a different location, such as a conveyor or a pack/ship zone (see 320 and 360 of FIG. 11) to deliver the items, or may transfer the items to another transport robot 862 for delivery to any of those locations. As shown in FIG. 8, there may be overlap 835 between certain of these zones.

According to certain aspects, mapping of items to a region of interest (e.g., slots on a shelf or rack) may be dynamic. For example, certain items may become more highly requested, and thus localization of those items to additional storage locations, and/or to storage locations closer to pack and ship areas of a logistics facility may enhance picking operations. Thus, according to certain aspects, the identities of items stored at specific regions of interest, as defined by the markers positioned according to the methods disclosed herein, may be dynamic. That is, item identities at regions of interest may be dynamic and may be redefined at any point during operation of the system from either the central server 200 or the WMS 201. In certain instances, signals may be communicated to the central server 200 or the WMS 201 regarding a new limitation or definition of product location, such as from any of the robots (100, 600, 900; i.e. using SLAM methods as detailed herein). This information may stem from recognition of SKU information on the item or from other characteristics of the item recognized by a manipulation robot (such as other visual characteristics or a weight of the item).

With specific reference to FIG. 11, another exemplary logistics facility 300 is shown which includes a defined robot only work zone 330. Items may be stocked on common commodity shelving 310 inside the facility. The system and method according to the present invention may define a plurality of transfer areas 360 in which items would be transferred to and from the manipulation robots 100 and/or transport robots 900, and/or from human workers. The transfer area 360 may possibly interface with a packing and shipping station 350, a conveyor 320, a staging area, or any combination thereof.

According to certain aspects, a human worker may remove picked items or a container 145 holding the items from the robot 100/900 at the transfer area 360. If a container 145 is removed, a new container 145 could be transferred to the robot 100/900 for fulfillment of the next order. The system may be designed to interface automatically with a separate conveyor system 320 which may be adjacent to the transfer area 360, whereby items or totes 145 could be automatically moved through a conveyor 320 around a facility to and from a robot picking area 330.

The method may employ transfer of picked items or the container 145 by a human operator or, the transfer of items may be automatic. That is, the onboard robot storage bed 140 of the manipulation robot 100 may have a mechanically actuated conveyance system that allows for automatic transfer to the conveyor 320 or other transfer area 360, or to the transport platform 910 of a transport robot 900. In this case, the manipulation robot 100 may adjust a height of the robot storage bed 140 to match a height of the conveyor 320/transfer area 360/transport platform 910. Additionally, the conveyance system of the transport platform 910 on the transport robot 900 may be actuated to transfer items, bins, or totes from the transport platform 910 to the conveyor 320/transfer area 360, or to the transport platform 910 of another transport robot 900. The conveyance system on either robot (100, 900) may be a small conveyor belt or may be a set of rollers or wheels, which is capable of shifting the held items or tote 145 to and from another platform or conveyance.

Alternatively, the automatic transfer of objects from the onboard storage bed 140 of a manipulation robot 100 may be performed by the manipulator arm 120 of robot 100. The manipulation robot 100 may transfer individual items using its end effector 175 grasping mechanism or the robot may transfer a container 145 carried in the storage bed by manipulating it with an extension tool 170 and end effector tool 175. In this latter case, the manipulation robot 100 may adjust a height of the robot storage bed 140 to match a height of the conveyor 320/transfer area 360/transport platform 910.

With reference to FIG. 10, the system's central server 200 may be used to process order information that is transacted with a WMS 201 and may coordinate the fulfillment of orders with a plurality of manipulation robots 100 and transport robots 900. All computation on the server 200 may be executed by one or more internal processors 220. The server may have two software modules that enable this order fulfillment coordination. The first processor may be a task dispatch module 228, which analyzes orders received from a WMS 201, and determines which of the plurality of manipulation robots 100 and/or transport robots 900 is to be assigned to an order. After one or more robots are selected for picking/transporting an order, the task dispatcher 228 instructs the robot 100/900 with high-level order picking information, such as, route navigation paths, SKU locations, and an order drop-off location. The task dispatcher 228 works closely with a system state monitor 230 to obtain key feedback information from the system. The system state monitor 230 may communicate with the manipulation robots 100 and the transport robots 900 to keep track of their current physical location within the facility, along with status information, which may include but is not limited to: whether the robot is currently assigned an order, any faults or error modes, health information such as remaining battery power or charging status, inventory information, etc.

The central server 200 may also be used to store and process centralized SKU information in an SKU database 256, which stores information required by the robots to complete the order picking. The processing of this SKU specific information may be executed within a SKU analysis software module 226. The SKU information can include SKU size and shape data, which can include physical dimensions, 3D geometry that can include point and triangle mesh structures, item weight, appearance information that can include colorized texture maps, and may include SKU marking codes, that can include barcode and UPC data. Additionally, the central server 200 may store information in the SKU database 256 about the locations and regions on the surface of the individual SKU units that are allowed, or not allowed, for grasping by the manipulation robot 100. This allows the manipulation robot 100 to grasp an item in a way that is known to be safe and stable and prevents the robot from grasping an item at a point or in a way that is unsafe or unstable.

According to certain aspects, the SKU information may comprise data collected by the system and methods disclosed in U.S. Pat. No. 10,311,634 titled "Three-dimensional scanning and data extraction systems and processes for supply chain piece automation".

With continued reference to FIGS. 9A and 14A, the onboard robot storage bed (140 and 640, respectively) may be configured to sense the weight of the item placed thereon. This information may be communicated to the central server 200 and/or WMS 201 and may provide additional verification that the correct SKU was picked, and that the item was properly transferred to the onboard robot storage bed. If the wrong weight is sensed in the storage bed, the manipulator arm (120, 620) may be used to remove the item from the storage bed. The item may be replaced to the storage location by the manipulator arm, or a signal may be sent to the central server 200 and/or WMS 201 requesting manual assistance, such as from a human pick worker. In the event that no weight is sensed in the storage bed, the manipulator arm may be used to select another replacement item and/or retrieve the dropped item. Further, a signal may be sent to the central server 200 requesting manual assistance, such as from a human pick worker, or to alert the system to a change in the SKU inventory.

The central server 200 may also store information about the state of the SKU inventory in the SKU database 256 and may process this information in the SKU analysis module 226. Such information may include the position of items in their stored location, the location and orientation of grasping points for the robot to attempt to pick, and the sequence in which items of the same SKU type and approximate location should be picked from the shelf. This enables a sufficiently fast picking operation for the manipulation robot, such that picking geometry and sequencing can be planned and stored in memory 256 on the central server 200 or, and also, on the local storage 216 of the manipulation robot, and does not need to be computed at the time of pick by a given manipulation robot. The central server 200 enables multiple manipulation robots to share information about the state of inventory and plans for picking, so that different robots can pick from the same storage location, without each one needing to sense and compute pick information.

Inventory and SKU status information may also be shared with the central server 200 and/or WMS 201 by the manipulation robots, and in some cases by the transport robots (900, 900'). For example, if a certain SKU item is absent, misplaced, or in a position that is not readily retrievable by the manipulation robot, the robot may send this information to the central server 200/WMS 201.

In certain instances, the manipulation robot may encounter a situation wherein the product at the target location (as defined by the central server 200 or the WMS 201) may not match the characteristics of the expected SKU at that location. In such an instance, the manipulation robot may send signals back to the central server 200 and/or WMS 201 indicating an error (i.e., mapping error or stocking error). If the SKU at the location is close in characteristics to the expected SKU, or if the target location includes SKU's having similar characteristics stored side-by-side, the manipulation robot may request clarification from the central server 200 and/or WMS 201, or may request assistance from a human worker. For example, the request may be displayed on a display screen (130, 630) of the manipulation robot (100 and 600, respectively), and the human worker may indicate the correct pick for the robot. Alternatively, the request may be displayed on a remote display screen, and a human may indicate the correct pick for the robot.

In the instance when the manipulation robot is unable to pick an item at a first location, such as when it encounters any of the errors mentioned above (e.g., item missing, wrong item, item position so that manipulator arm can't execute the pick, etc.), a redundant picking method/system may be employed. With reference to FIG. 8, when the manipulation robot encounters an error at a first pick location 841, it may travel to a second pick location 842 and attempt the same pick. Should the manipulation robot encounter an error at this second pick location 842, it may travel to a third pick location 843 and attempt the same pick. This redundant storage of items or totes may improve efficiency and reduce error rates in a pick operation. For example, should the pick accuracy at a single pick location be about 80%, inclusion of at least a second pick location would increase the pick accuracy to about 96%, and inclusion of a third pick location would increase the pick accuracy to about 99.2%. Should the pick accuracy at a single pick location be about 90%, inclusion of at least a second pick location would increase the pick accuracy to about 99%, and inclusion of a third pick location would increase the pick accuracy to about 99.9%. In situations of limited space within the logistics facility, only high traffic items may be stored in multiple pick locations.

The markers for each of these redundant storage locations or slots would not be the same. The central server 200 may store information about the infrastructure of the facility of operation in a map storage database 254. This can include information about the storage racks 310 such as shelving dimensions (width, depth and height), separate shelf level heights, shelf face widths, and rack column widths. The infrastructure information can be created, modified and analyzed through a map creation software module 224 on the central server 200. Using this module, a human operator can manually create a facility map or may load the map data from a predefined file, such as a Computer Aided Drawing (CAD) file, or may load mapping data automatically collected by a robot (e.g., 100, 600, 900, 900'), such as by any one or more of their onboard sensors, which can use its onboard sensors to observe the facility infrastructure and automatically generate a map.

The robots (100, 600, 900, 900') may also dynamically upload mapping data automatically collected by their various sensors. That is, the one or more robots may collect image data and utilize simultaneous localization and mapping (SLAM) to generate a map of the logistics facility using the location of various markers (e.g., see 420 in FIG. 12) dispersed throughout the warehouse. SLAM provides real-time construction/updating of a map of an unknown environment while navigating through that environment. Popular SLAM approximate solution methods include particle filter, extended Kalman filter, and GraphSLAM.

With reference to FIGS. 9A and 9B, the manipulation robots 100 may have a set of sensors (150, 110) that enable autonomous navigation within a facility and sensors 110 that allow it to identify and localize individual SKUs for picking. The sensors (150, 110) may be 3D or structured light depth cameras, stereo cameras, color cameras, grey scale cameras, laser ranging devices, or any combination thereof. These sensors (150, 110) may provide high resolution 3D point data to the manipulation robot 100 that details the presence of physical objects within the sensors (150, 110) field of view. The sensors (150, 110) may be connected to the onboard computer processor 218, which may process the 3D point and color data to extract information for navigation and picking. Alternatively, a unique set of sensors mounted on the manipulation robot 100 may be used for picking and for navigation. The manipulation robot may be programmed to point the sensors in a direction that is expected for the task.

In order to perform pick work, the manipulation robots 100 may move and navigate between pick locations in the work zone 330 and an order transfer area 360 (see FIG. 11). During navigation, the sensor data may be processed by the onboard computer processor 218 in a navigation software module 212 to extract local mapping information that indicates which areas around the manipulation robot 100 are traversable and which areas contain obstacles. The ground facing sensors 150 on the manipulation robot 100 are primarily used to generate this mapping information and collision detection information. There may be two ground facing sensors 150, a front-facing one and a rear-facing one. This unique design allows the manipulation robot 100 to navigate while driving both forwards and backwards, which in certain picking scenarios, eliminates the need for the manipulation robot 100 to turn around, thus reducing travel time and increasing picking efficiency.

The sensor data may be processed by the onboard computer processor 218 in a navigation software module 212 to extract visual or audible landmark locations, such as the visual landmark marker 420 locations shown in FIG. 12. According to the presently disclosed invention, the system may use landmarks such as visual markers 420, which may be placed ahead of time in fixed locations around the facility of operation. At least one of the onboard sensors (150, 110) may be used to detect these markers 420 and locate the manipulation robot 100 relative to them. This enables the robot 100 to know precisely where it is in the facility. Each marker 420 may have a unique pattern that is different from other markers 420 within the same facility. The unique marker pattern 420 may be recognized by navigation module 212 algorithms which may be run by the onboard computer processor 218, thus allowing the manipulation robot 100 to localize itself without ambiguity. As indicated above, the unique marker pattern 420 may also be recognized by navigation module 972 algorithms of the transport robot 900, which may be run by the onboard computer processor 978 allowing the transport robot 900 to localize itself without ambiguity.

Exemplary landmarks include visual markers as described above, which may include any identifiable unique visual pattern, such as barcodes, numbers, letters, geometric shapes, or even a specific pattern of blinking lights, and audible markers, which may include at least unique patterns of sound or even specific tones of sound. Before a robot can use landmarks for navigation, the characteristics of the landmarks may be stored on the central server 200, the WMS 201, and/or on the storage (216, 976) of either robot (100, 900 respectively). When the characteristics of the landmarks are stored on the storage (216, 976) of the robots (100, 900), they may navigate autonomously through a logistics facility and may not require constant communication from the central server 200 or WMS 201.

Additionally, as depicted in FIG. 12, careful attention may be given to the placement of markers 420, which may be vertically mounted on shelving 310. This allows the robot to locate vertically mounted visual markers 420 within the field of view 410 of its arm mounted sensor 110. Vertically mounted markers 420 are desirable because markers installed on the floor of a facility may be more difficult to maintain.

According to certain aspects, the presently disclosed invention provides methods and systems that assist the various robots described herein in finding their way around a logistics facility and identifying the exact locations of specific items, bins, or cases to pick. Accurate execution of such operations is an important component to overall order picking success. As such, methods for robust robot localization, mapping and region of interest segmentation beyond simple navigation markers on inventory shelving or facility flooring are disclosed herein.

In manual or robotic picking areas, logistics facilities usually store their product inventory on racks, which are subdivided into shelves and finally into slots on each shelf. Each slot generally contains a quantity of unique product units, or SKUs. Some facilities have wide product slots. In these cases, the robot can see the complete slot, and simple slot markers (e.g., colored dots) may work adequately for identification. However, other facilities may store their SKUs densely and may therefore have narrow product slots.

As defined herein, a "wide slot" is one in which the extents, i.e., edges, of the slot are not visible in a single camera frame with a robot camera, and a "narrow slot" is one in which the extents of the slot are viewable in the single camera frame. In this latter case, multiple narrow slots may be viewable in a single camera frame.

Further complicating slot identification in these cases are neighboring slots that contain nearly identical products such as vitamin bottles, salad dressing bottles, or cereal boxes. For facilities that have narrow slots, or which store similar items adjacent each other, the robots' overall success will be dictated by their ability to identify the correct slot tag markers. This success generally requires a more robust marker system than the simple solutions currently available.

The present invention utilizes a novel marker system that may be applied on every inventory rack in a logistics facility and may even be used across multiple logistics facilitates. The marker system provides successful picking without having to positively identify the object to be picked.

According to certain aspects, the markers generally serve as visual fiducial markers, which can be used to extract pose and marker signature. Currently available markers use a binary matrix to encode information. An inherent flaw in use of this binary matrix is that it limits the maximum number of markers you can have, and thus the maximum number of items or locations that can be identified in a logistics facility. While increasing the resolution of the marker somewhat mitigates this limitation, the number of possible markers remains finite and generally less than the number required in current day logistics facilities. Such a facility can theoretically contain an infinite set of mapping points, which means that, over a period of time for a sufficiently large facility, the markers will need to repeat.

The present solution to this problem includes generating markers based on the physical location of an individual rack within the logistics facility. Thus, even though the finite number of markers and potentially infinite number of racks means that these markers will still repeat, according to the present solution, the tags only need to be unique in a local span. However, ensuring that a tag is unique locally means maintaining information on neighboring racks. This activity creates a large bookkeeping operation to keep up with neighboring rack data while generating markers for a single rack.

An alternate solution is to compute a continuous periodic function that repeats tags after a preset span. For any minor changes to the racks locally, however, an entire span of racking would have to be recomputed to ensure that the contiguous nature of the tag progression is maintained. With the potentially infinite span of a logistics facility, the problem becomes intractable if there is infinite flexibility in the way racking is arranged. Thus, if marker generation were to be automated, certain constraints would need to be placed on the way the facility could be arranged or rearranged, or on how a robot may operate in such a facility.

This problem can be offset by imposing constraints on the facility to make the problem tractable. Having a general set of assumptions that are valid throughout the facility allows a locally unique set of markers to be computed for each rack without maintaining data on its neighbors. This solution has a two-fold advantage: (1) locally unique markers can be generated as a result of a rack's unique attributes, meaning information on the rack's neighbors is unnecessary and does not have to be maintained; and (2) while picking, the feature vector of markers to be expected at the shelf can be computed using rack information.

The presently disclosed invention solves both issues, where a large cumbersome optimization does not need to be computed, and local changes to racks do not need an entire span of racks to have their markers regenerated to guarantee local uniqueness. This solution also solves the bookkeeping problem, i.e., a database does not need to be maintained for the markers and their location, as they are simply computed on the go.

Accordingly, the presently disclosed invention uses a continuous approach to marker placement that allows locations of discrete markers to be mapped to a continuous periodic function. Rather than associating specific tag identities with rack identities, these marker tags are associated with the location of the slots or areas of interest they represent. As such, the presently disclosed invention comprises three novel ideas: (1) locally unique features, (2) computation of a landmark index based on a periodic function, and (3) the ability to use a finite set of landmarks over an infinite space.

This novel approach uses a periodic function that has the width of one marker in metric space as the minimum resolution. An exemplary periodic function is shown in FIG. 20 wherein the marker index in shown on the Y-axis (integers) mapped to metric space on the X-axis (meters).

Figure 20:
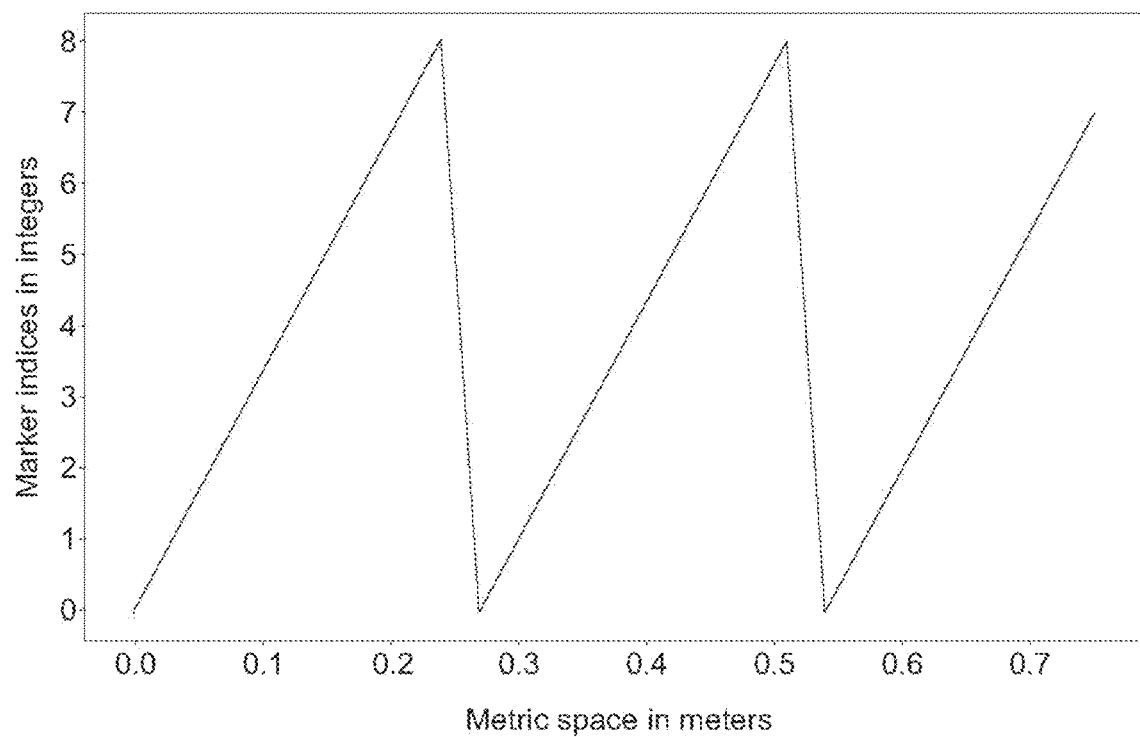
FIG. 20 illustrates an exemplary periodic function used to generate markers in a repeating pattern of integer indices in accordance with certain aspects of the presently disclosed invention.

Moreover, the unique function shown in FIG. 20 differentiates a unique physical position (x-axis) for each marker value (y-axis). This method produces markers in a repeating pattern of integer indices for an infinitely long axis in the metric space. Therefore, every slot on a rack maps its metric position to the corresponding marker and has a locally unique marker index.

Figure 21:
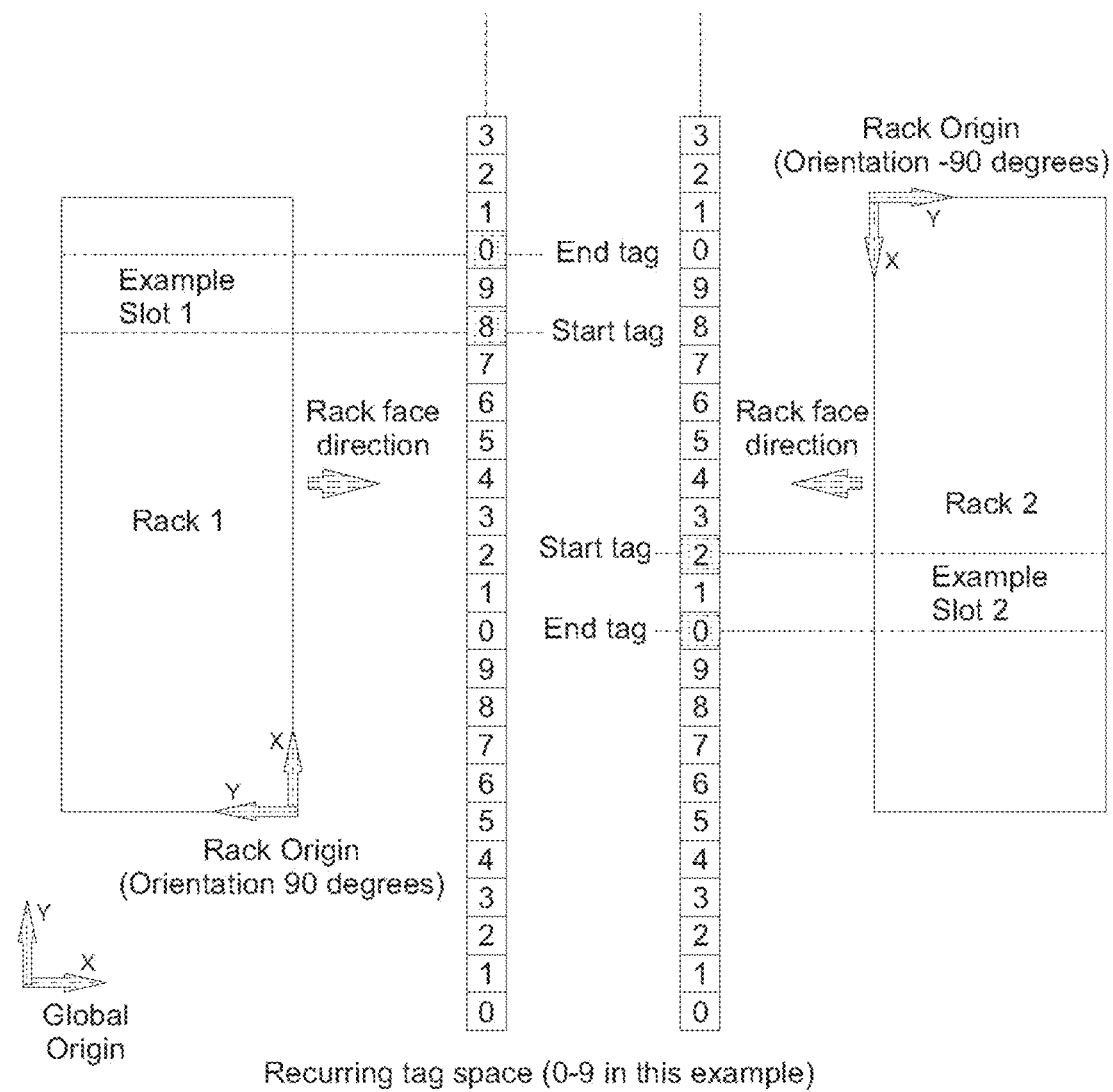
FIG. 21 illustrates an exemplary distribution of locally unique fiducial markers on racks in accordance with certain aspects of the presently disclosed invention.

With reference to FIG. 21, an example of how the presently disclosed method may distribute locally unique markers on racks using a recurring tag space of 0 to 9 is shown. Individual markers are positioned at each side of a slot or region of interest. Thus, adjacent slots may share a single marker therebetween. Such an arrangement increases the number of markers that may be positioned on a shelf, which may be especially useful for closely spaced items or narrow slots. Moreover, the robots that use the presently disclosed systems and methods may be configured to understand a vertical position of the sensors that detect these markers. As such, a z axis location for the marker may be understood by the robot (i.e., from a position of the onboard sensors). As such, the methods of the present invention may use the markers with the same pattern within a single rack as long as they are located at different vertical (z-axis) positions, e.g., at different shelf heights.

This method allows for multimodal localization using the markers positioned at slots or regions of interest. Further, it allows for implicit global localization for probabilistic beliefs, as a repeating pattern for any marker would be far enough from the current state to be not considered as an update to the multimodal belief. It also allows for the robot to update its belief on where the markers themselves are actually located in a full simultaneous localization and mapping (SLAM) application, i.e., in instances when the marker has been physically placed in the wrong location (either relatively on the shelf, the whole rack, or both).

According to certain aspects, individual racks in a logistics facility may also include a marker that may uniquely identify a rack and/or rack location within the logistics facility. The markers placed on the racks may be different from the markers placed on the shelves, as described above. For example, according to certain aspects, each rack in a logistics facility may include a unique 1D barcode positioned at an end thereof. Further, the 1D barcodes may be positioned vertically so that the information may be accurately scanned by sensors of a passing robot. Alternatively, or additionally, these markers may be positioned on the floor or at other locations within such a facility (e.g., support beams, doorways, walls) that may provide granular orientation information that is differentiated over the more precise location information provided by the set of markers placed using the presently disclosed periodic function.

Accordingly, these additional markers may aide in a granular definition or mapping of the logistics facility. Once at a specific rack or granular location within the facility, the markers disclosed herein may provide the fine mapping to accurately locate and identify a slot or region of interest on the rack.

This invention addresses several challenges associated with localization, mapping, and region of interest segmentation, which include the ability to positively identify a region of interest (e.g. a slot) to find an item of interest using smaller markers detectable by low-resolution cameras. These markers provide localization to and positive identification of the region of interest by guaranteeing local uniqueness of landmarks in a 1-D manifold of 3-D space of potentially infinite span (i.e., marker location calculated based in a periodic function).

The unique localization of markers at the region of interest allows mapping of a finite set of landmarks to an infinite space. Moreover, localization of the markers based on a periodic function allows onboard computation of expected landmarks as opposed to maintaining a lookup table of markers to locations in space, and ready identification of missing or mispositioned markers.

The identity of these identifiers may be determined by onboard processors of the robot, such as any of the robots disclosed herein, or by processors of a remote server such as the WMS 201 or the central server 200. These identities may be used to calculate or understand a pose of the robot within a 3D space. Sensor data from any of the robots disclosed herein may be processed by the onboard computer processor 218 in a navigation software module 212 to extract visual or audible landmark locations, such as the visual landmark markers 420, 420*b*, and 420*c* locations shown in FIG. 12. According to the presently disclosed invention, the system may use fiducial markers 420, which are be placed ahead of time in fixed locations based on the methods of the presently disclosed invention. At least one of the onboard sensors may be used to detect these markers 420 and locate the robot relative to them. This enables the robot to know precisely where it is in the facility.

Each marker 420 may have a unique pattern that is different from other markers 420 within the same facility. The unique marker pattern 420 may be recognized by navigation module 212 algorithms which may be run by the onboard computer processor 218, thus allowing the manipulation robot to localize itself without ambiguity. As indicated above, the unique marker pattern may also be recognized by navigation module algorithms 972 of a transport robot, which may be run by the onboard computer processor 978, thus allowing the robot to localize itself without ambiguity.

As shown in FIG. 12, a region of interest (426) may be defined by the placement of markers 420 and 420*b* at edges of the region of interest. A second adjacent region of interest (428) may be defined by placement of markers 420*b* and 420*c* at the edges thereof, wherein a single marker may be shared between regions of interest (i.e., marker 420*b*).

Exemplary markers will comprise any identifiable unique pattern, such visual fiducial markers (2D and 3D barcodes, QR codes, data matrix, ArUco codes, or even a specific pattern of blinking lights), RFID, and audible markers (patterns of sound or even specific tones of sound). Before a robot can use markers for navigation, the characteristics of the markers may be stored on the central server 200 or on the remote storage (216, 976) of the either robot (100, 900). When the characteristics of the markers are stored on the remote storage (216, 976) of the robots (100, 900), they may navigate autonomously through a logistics facility and may not require constant communication from the central server 200.

According to certain aspects, the remote server such as the WMS 201 or the central server 200 may be configured to invalidate pose information sent from a robot and may enforce a different pose via an external message. According to certain other aspects of the systems and methods, a human user may be able to enforce a different pose for a specific robot, such as via interaction at a user interface of the robot (display screen, USB port, etc.).

The central server 200 and/or WMS 201 may also be used to store and process centralized information about the markers and their initial mapped locations within the logistics facility, in a marker database. The location within the logistics facility generally comprises a set of x, y, and z coordinates. For example, the x,y coordinates provide a position in logistics facility of a rack and z position provides the height of a shelf on the rack. The processing of this information may be executed within a marker analysis software module.

Inventory and SKU status, as well as pose information for markers may also be shared with the central server 200 and/or WMS 201 by the manipulation robots and transport robots. For example, if a certain SKU item is absent, misplaced, or in a position that is not readily retrievable by the manipulation robot, the robot may send this information to the central server 200/WMS 201. As another example, if a marker is missing or mispositioned, the robot may send this information to the central server 200/WMS 201. Such information, either alone or in combination, may allow the robot to proceed to a second pick location that may house the item of interest, or place that second location on a route itinerary. Alternatively, the robot may signal for assistance from a human worker, such as through signals on the robot or via communication with the central server 200 and/or WMS 201. For example, the request may be displayed on a display screen 130 of the manipulation robot 100, and the human worker may indicate the correct pick for the manipulation robot 100. Alternatively, the request may be displayed on a remote display screen, and a human may indicate the correct pick for the manipulation robot 100.

In addition to onboard sensors (150, 110) and navigation software 212, the navigation process may also be aided by a remote server such as such as the WMS 201 or the central server 200. The remote server may have access to the central facility map storage 254, which enables it to analyze the stored maps in depth and optimize routes between pick locations. As such, the central server 200 may have a set of route planning algorithms in a software module 222 that allow it to pre-compute navigation routes within the robot work zone 330, and between the work zone 330 and any transfer areas 360, or within the various defined work zones shown in FIG. 8 (810, 820, 830). These routes can be stored after computation in a route storage database 252 within the central server 200, so that they can quickly be recalled and communicated to manipulation robots 100 and/or transport robots 900 for rapid response during order fulfillment and for interchangeability between multiple robots (100, 900).

To perform individual picks, onboard sensors (150, 110) on the manipulation robots 100 may be used to detect and localize individual items or totes along with the specific locations and orientations of the grasp points 501 on the surface of an item or tote. FIGS. 13A and 13B present an exemplary diagram of how the manipulation robot 100 may use its end effector 175 and extension tool 170 to grasp an item at a specific point and orientation 501. During a pick, the sensors 110 also locate the infrastructure around the items such as shelving levels 500, rack columns, shelf faces and signage. This geometry information for the infrastructure is required for pick manipulation algorithms in a manipulation software module 214 to determine a pick trajectory that is collision free, such that the manipulation robot 100 is able to grasp the item without colliding with surrounding objects.

Special attention has been given to the placement of the picking perception sensors 110, which are mounted on the manipulator arm 120 in an orientation that allows them to see the pick location while the end effector 175 is positioned above the storage bed 140, as is shown in FIG. 9B. This method enables the system to localize additional pick items, grasp positions and orientations after a pick has been made and an item is being placed into the storage bed 140. This picking geometry information can be stored in memory 256, on the central server 200, or, and also, on the local storage 216 where it can be recalled later to enable sufficiently fast picks of the same SKU the next time it is required. Additionally, it is common for more than a single item of a particular SKU to be picked for an order. In this case, the perception and localization computation of additional pick items can be done at the same time the manipulator arm 120 is placing a previous pick in the storage bed 140, which may help to improve the speed and efficiency of picking multiple items which are in near proximity.

An additional "fine tuning" sensor may be added to the robot near the end effector tool 175 to help accurately perform a pick grasp. After the picking sensor 110 positively identifies and localizes a pick point, there may still be some positioning error present due to uncertainty in accuracy and calibration of the sensor 110. Therefore, a tuning sensor may be mounted at the tip of the end effector tool 175 on the robot 100 to more precisely locate the position of the tool 175 relative to the desired pick location. The tuning sensor would have the desired pick location in its field of view as the robot is attempting the pick grasp. As the manipulator arm 120 moves towards the desired pick location, the tuning sensor could be used to make small adjustments that guide the tool 175 toward the desired point.

The manipulation robots 100 have a mobile base 160 that is controlled by the onboard computer processor 218. The mobile base may have two main drive wheels 167, each driven by a servo motor. Each drive wheel 167 may have an encoder that provides motion feedback, which can be used to precisely control the speed of each wheel in order to achieve the desired rotation and translation velocities of the robot 100. The feedback data may also be used for odometry to estimate the motion of the robot 100 relative to the facility. The odometry may be responsible for guiding the robot 100 navigation at times when visual markers 420 are out of sensor (150, 110) range. The mobile base 160 may also use passive wheels, such as casters 165, for stability and weight distribution.

All systems onboard the manipulation robot 100 may be powered from onboard batteries 190 that are similar to the field replaceable batteries 950 of the transport robot 900. For example, the batteries 190 of the manipulation robot 100 may be housed within a cavity in the mobile base 160, may be rechargeable to maintain operation through an economically viable work period, and may be charged opportunistically during times at which no orders are present for the manipulation robot 100 to pick such as at a charging station (340 or FIG. 11), or may be charged separately from the manipulation robot 100. In this later case, the batteries 190 may be swapped with separately charged batteries for continued operation of the robot 100 (hot-swapped as detailed above). Such a battery hot-swap may be performed using permanently installed smaller short-life (minutes) onboard batteries to maintain power while a larger modular battery 190 is replaced with a fully charged battery 190 of equivalent design. As indicated above for the transport robot, hot-swapping may be done manually by a human operator, or may be done automatically by internal mechanisms of the manipulation robot 100 and charging station.

A manipulation robot according to the presently disclosed invention may be specifically configured and designed to transport totes or bins to and from a storage area in a warehouse or other logistics facility, or to transfer those totes to/from a transport robot 900. With reference to FIGS. 14A and 14B, a manipulation robot 600 may have a wheeled mobile base 660, a containment area 640, and a manipulator arm 620. Also shown is an exemplary tote 650 on the containment area 640. Further, the manipulation robot 600 may have internal batteries 690, an onboard computer processor 218 with memory storage 216 (see FIG. 10), and a user interface 630. The computer processor and any associated components (memory storage, communication, connections) may be stored in a portion of the manipulation robot 600 protected by an enclosure, such as the main body case 615 of the robot.

The manipulation robot 100 may unload a tote 650 stored on the containment area 640 by first aligning the containment area 640 with the conveyor, transport platform 910 on the transport robot 900, or another staging area. The manipulator arm 620 may then grasp/move the tote from the containment area 640 and move it to the conveyor or transport robot, or the platform. Alternatively, or in addition, the containment area 640 of the manipulation robot may include a conveyance means, such as a conveyor belt or roller bars.

According to certain aspects, the containment area 640 may include more than one level configured to hold a bin or tote 650, wherein at least that portion of the containment area 640 closest to the main body of the robot 600 is configured to hold the multiple totes 650 and to remain stationary with respect to the manipulator arm 620. An adjacent portion of the containment area 640 closest to/connected to the manipulator arm 620 may be vertically moveable with respect to the main body 615 of the manipulation robot 600.

According to such a configuration, the manipulation robot 100 may hold a tote 650 on the mobile portion of the containment area 640 during picking operations, and may move that tote 650 to one of the stationary levels of the containment area when the picking operation is complete by aligning the mobile portion of the containment area 640 with the stationary level holding the tote of interest. Transfer may be actuated by the manipulator arm 620 or by a conveyance system on either or both of the stationary/mobile containment areas. The manipulation robot 600 may select another empty or partially filled tote 650 (i.e., incomplete pick order) from another of the stationary levels of the containment area, align the mobile portion of the containment area 640 with the stationary level holding the tote of interest, transfer that tote/bin to the mobile portion of the containment area 640, and start/continue a different pick order. In this way, the manipulation robot 600 may complete several orders at one time without the need to unload/travel to the staging area or a conveyor.

When the pick operation is completed, the manipulation robot 100 may unload the various totes stored on the different stationary levels by aligning the mobile portion of the containment area 640 with a tote 650 on the stationary portion of the containment area. The manipulator arm 620 may grasp/move the tote from the stationary level to the mobile level of the containment area 640. The manipulation robot may then align the mobile portion of the containment area 640 with the conveyor, transport platform 910 on the transport robot 900, or another staging area to unload the tote.

Alternatively, these processes may be reversed for item or tote put-away.

Each manipulation robot 600 may also be equipped with safety features which can include: one or more safety lights or strobes 655, an audible warning annunciator or horn, one or more emergency stop buttons, the ability to display fault, error and/or intended action (such as navigation turn signal) information on the user interface 630 or at some other point on the manipulation robot 600, or any combination thereof.

As discussed above, the onboard computer processor 218 may be configured to run a set of programs with algorithms capable of performing navigation and picking. Further, the onboard computer processor 218 may utilize data from sensors to output control signals to the mobile base 660 and manipulator arm 620 for navigation and picking, respectively.

The user interface 630 may include a graphical display monitor and an input device, where the input device may be a touch screen (as shown by 630), a track ball, voice command, a keyboard, input buttons or any combination of these devices and possibly others. As discussed above, the user interface 630 allows a user to command and control each manipulation robot 600 to perform localized tasks and to enter picking dispatch information manually, thus sending the robot on its mission.

A robot manipulator arm 620 is used in the presently disclosed manipulation robot 600 to pick totes 650 or bins within a logistics facility. Common logistics storage infrastructure, such as an ordinary shelf or rack, may be used to store the totes or bins. As shown in FIGS. 14A and 14B, the manipulator arm 620 may be mounted to the containment area 640 at a position distal from the mobile base 660 of the manipulation robot 600. The vertical reach of the manipulator arm 620 may be extended, for example, by mounting a proximal end of the containment area 640 on a track that may provide vertical motion of the containment area with respect to the mobile base 660.

The manipulator arm 620, which is at the distal end portion of the containment area 640, may be mounted on a vertical actuator stage which may raise and lower the manipulator arm 620 relative to the containment area 640. This may provide the clearance necessary to enable the manipulator arm 620 to transfer more than one tote 650 or bin onto the containment area 640, such as stacked one on another, or as detailed above (multiple levels on the containment area). Further, the articulated segments of the manipulator arm 620 may provide the clearance necessary to enable the manipulator arm 620 to transfer more than one tote 650 or bin onto the containment area 640 without the need or use of a vertical actuator stage.

As discussed above, the manipulation robot 600 may use an end effector 675 on the manipulator arm 620 to pick totes 650 or bins from their stored location and transfer them to the containment area 640. The end effector 675 may be a suction cup, which may be connected to a vacuum pump through an onboard computer processor 218 controlled valve. The vacuum suction at the suction cup may be engaged and disengaged by actuating the valve, thereby allowing the manipulation robot 600 to grasp the desired tote 650 or bin on contact and then release it when necessary.

Alternatively, the end effector 675 may be a mechanically actuated gripper such as, for example, a robotic hand having articulated digits, a simple gripper, an electroadhesion end effector, a magnetic end effector, or combinations thereof, and the robots may comprise an end effector swap mechanism configured to permit a change of the end effector. The manipulation robot 600 may also include an extension tool 670, which may enable the manipulation robot 600 to position the end effector 675 at a sufficient depth into a storage rack so that the end effector may reach a desired tote 650 or bin while maintaining clearance for the manipulator arm.

The containment area 640 of the manipulation robot 600 may comprise a conveyance means such as rollers, which may improve movement of a tote 650 onto the containment area or off of the containment area. Alternatively, the containment area 640 may comprise a mechanically actuated conveyance device that allows for automatic transfer. The conveyance device may be a small conveyor belt or may be a set of rollers or wheels which is capable of shifting the tote 650 to and from another containment area or conveyance (such as the retrieval queue 722 of a pack and ship area 720, or the retrieval queue 752 of a replenishment area 750; see FIG. 15).

As discussed above, the manipulation robot 600 may comprise one or more sensors that may be used to aid in at least navigation of the mobile base 660 throughout a logistics facility, movement of the manipulator arm 620 and/or end effector 675 to pick a tote 650 or bin, and detection of obstacles in the travel path of the manipulation robot 600.

At least one sensor may be centrally located on the manipulator arm 620 such that rotation of the arm directs the at least one sensor toward the tote 650 to be picked for identification and localization. Positioned opposite the at least one sensor may be at least one opposite sensor that is mounted such that once the manipulator arm 620 angles itself to pick the tote, the opposite sensor is now aimed directly onto containment area 640. This opposite sensor may provide the data necessary to allow the onboard computer processor 218 (see FIG. 10) to analyze the containment area 640 to find the optimal location to place the tote 650, considering that there might be previous totes already container thereon. Additionally, with two such sensors aimed in opposite directions, the system may be able to pick totes from the left or the right side of the manipulation robot 600.

Further, the containment area 640 may comprise a calibration target which may be viewed by one or more sensors on the manipulator arm 620. As such, information on the calibration target may be used to calibrate these sensors to ensure that all parameters are within specifications, and if not, update the parameters to reflect the current configuration.

FIG. 15 shows a typical warehouse or distribution center utilizing a manipulation robot system 700 according to certain aspects of the presently disclosed invention. Shown are human pickers 780 in a pack and ship area 720 as well as manipulation robots 600 pulling totes from and returning totes to shelving in a storage area 710. The storage area may contain standard shelving, and may be part of any logistics facility.

As discussed above, and with reference to FIGS. 10, 11 and 15, the central server 200 may be responsible for receiving orders from the WMS 201. The order may contain information such as, for example, UPC, product description, location in the warehouse (which rack, which shelf, which slot on the shelf), order number and quantity of each product to be shipped. This information may be processed by software running on the central server 200, and the best transport robots(s) 900 and/or manipulation robot(s) 600 to retrieve the tote(s) based on current location or availability may be determined.

Once the robot(s) (600, 900) is selected, it will autonomously move to the location of the tote on the specific shelf. Once there, the manipulation robot 600 may be able to detect the tote via image processing techniques, which might identify the tote or read a barcode to verify that it is the correct tote. The manipulation robot 600 may be able to do additional movements to position itself optimally in front of the tote so that the manipulator arm 620 is able to pull the tote from the shelf onto the containment area 640 on the manipulation robot 600. After finding and moving the tote onto the containment area 640, the manipulation robot 600 may go to another location in the storage area 710 and retrieve another tote. In such an instance, the second or third tote may be positioned on top of the previous tote in a stacking fashion, or may be positioned on different levels of the containment area 640 as described hereinabove.

After retrieving the tote(s), the manipulation robot 600 may autonomously navigate to a retrieval queue 722 in front of the human picker 780 that is to complete the order. Alternatively, the manipulation robot 600 may transfer the tote to a transport robot 900, and the transport robot 900 may autonomously navigate to the retrieval queue 722 in front of the human picker 780 that is to complete the order. It is possible that an order requires multiple totes and multiple robots 600/900 delivering these totes over a period of time. The system may optimize the overall performance such that for each order, the items are delivered to the retrieval queue in a timely fashion so that the human picker 780 can close out that order and send it to shipping for delivery to the customer.

After a manipulation robot 600 or transport robot 900 has dropped off the tote(s) 650a at the retrieval queue 722, the human picker 780 may transfer a product from the tote 650a into a shipping box 790. The shipping box 790 may be transferred to a shipping department or area 730 on a conveyance means 795. The manipulation robot 600 or transport robot 900 may then be instructed by the central server 200 to pick up totes (650b, 650d) from any of the storage queues (724, 754) that have totes ready to be placed back into the storage area 710. The manipulation robot 600 can pull up to the storage queue (724, 754), which has totes (650b, 650d) waiting, and pull one or more totes onto its containment area 640 using the manipulator arm 620, or a conveyance system on the containment area 640. Alternatively, the transport robot 900 can pull up to the storage queue (724, 754), which has totes (650b, 650d) waiting, and transfer a tote onto its transport platform 910, such as by using the roller bars 912.

Once it has loaded the totes (650b, 650d) from the storage queue (724, 754), the manipulation robot 600 or transport robot 900 may then move to the location in the storage area 710 that is to hold this tote. If transported by the manipulation robot 600, it may use its manipulator arm 620 to transfer the tote to the storage location. If the tote is transported by the transport robot 900, it may have an assigned manipulation robot 600 that will enable the transfer (after first transferring the tote from the transport robot to the manipulation robot).

If the tote 650b has high moving products, the central server 200 may place the tote in an optimal location in the storage area 710 to speed up retrieval for future orders. If the tote is empty, the human picker 780 may store the tote on the floor, or in a location near them instead of putting the tote on the storage queue. Alternatively, the human picker 780 may place the empty tote in the storage queue 724 so that a manipulation robot 600 may transport the tote to the replenishment area 750.

After a manipulation robot has placed each of the totes 650b in the storage area 710, it may resume retrieval of other totes if there are orders to be picked, perform more storage activities if there are totes to be stored, or reorganize the shelves if the central server 200 determines it would be valuable. Lastly if there are no tasks for the manipulation robot 600 or the transport robot 900, it may position itself in front of a charging station so it can charge its batteries.

Another aspect of the invention is how the system handles replenishment. Replenishment is the act of putting newly obtained products into a bin for future retrieval. For example, when a new case of product 792 arrives in a receiving department or area 740, the central server 200 may instruct a manipulation robot 600 or a transport robot 900 to pick up one or more totes in which the new product will be placed. The case of product 792 may move along a conveyance means 753 to a replenishment area 750. One or more manipulation robots 600 or transport robots 900 may retrieve tote(s) 650c for that particular product from the storage area 710 and deliver them to the replenishment retrieval queue 752. A human 782 may then put the items into the totes(s) 650d and place them onto the replenishment storage queue 754. A manipulation robot 600 or a transport robot 900 will then pick up one or multiple totes to be placed in the storage area 710. Alternatively, if this is a newly stored product, or as discussed below, includes filling of additional totes not previously found in the storage area 710, the human 782 may fill totes stored within the replenishment area 650e or supplied via the conveyance means 753.

The central server 200 may have knowledge of tote capacity, storage area 710 capacity and the speed at which products move. When overall storage area 710 capacity permits, the system may put high moving products into multiple bins instead of squeezing into one bin, thus allowing multiple manipulation robots 600 or transport robots 900 the opportunity to deliver totes of high moving products to human pickers at the same time. The system may manage this optimization automatically and handle the condensing of multiple totes of the same product when situations change concerning the speed at which the product is moving.

The mobile robot 600 shown in FIGS. 14A and 14B, and the system discussed with reference to FIG. 15, have been described as being configured to pick totes or bins. It should be noted, however, that the specific configurations shown and discussed may be used to pick and/or put-away individual products or items in the tote transport platform, or in a tote placed on the tote transport platform, in addition to totes or bins.

ASPECTS OF THE INVENTION

The following aspects are disclosed in this application:

Aspect 1: An autonomous mobile robot comprising: a mobile base having a vertically mounted attachment arm; a transport platform positioned above and vertically separated from the mobile base via connection to an end of the attachment arm distal from the mobile base, wherein the transport platform comprises a conveyance system; a plurality of sensors including a laser ranging device, wherein the laser ranging device is attached to an underside of the transport platform to provide an unobstructed view; a remote communication interface; a memory configured to store robot specific information; and one or more processors coupled to the plurality of optical sensors, the memory, and the mobile base.

Aspect 2: The robot according to aspect 1, wherein the memory comprises computer program instructions executable by the one or more processors to receive data from and send data to a central server, process data received from each of the sensors, and output control signals to the mobile base and the conveyance system.

Aspect 3: The robot according to aspect 1 or 2, wherein the field of view of the laser ranging device is at least 180-degrees.

Aspect 4: An autonomous mobile robot comprising: a mobile base, a plurality of sensors including forward and rear facing cameras and a laser ranging device, wherein the laser ranging device is positioned in a horizontal cavity of the mobile base, the horizontal cavity located in a front portion of the mobile base and configured to afford the laser ranging device a 180-degree field of view on a horizontal plane elevated from and parallel with a floor surface, one or more processors, a remote communication device, and a memory comprising computer program instructions executable by the one or more processors to receive data from and send data to a central server, process data received from each of the plurality of sensors, and output control signals to the mobile base.

Aspect 5: The robot according to any aspect 4, further comprising: a transport platform positioned above and vertically separated from the mobile base via connection to an end of at least one attachment arm distal from the mobile base, wherein the transport platform comprises a conveyance system, wherein the memory further comprises computer program instructions executable by the one or more processors to output control signals to the conveyance system.

Aspect 6: The robot according to any one of aspects 1 to 5, wherein the field of view of the laser ranging device is greater than 240-degrees.

Aspect 7: The robot according to any one of aspects 1 to 6, further including a field replaceable battery comprising at least one battery cell, a charging interface for connecting the at least one battery cell to an external power source, and a blind mate connector electrically connected to the at least one battery cell and configured to engage a corresponding blind mate connector on the autonomous mobile robot.

Aspect 8: The robot according to aspect 7, wherein the field replaceable battery comprises a self-contained charging circuit that is connectable to an external power source.

Aspect 9: The robot according to aspect 7 or 8, wherein the autonomous mobile robot is configured to autonomously exchange the field replaceable battery based on signals received from one or both of a charge sensor on the field replaceable battery and a central server.

Aspect 10: A logistics facility automation system comprising: a central server; at least one transport robot according to any of aspects 1 to 9; and at least one manipulation robot.

Aspect 11: The system according to aspect 10, wherein the at least one manipulation robot comprises: at least one manipulator arm, at least one item containment area, a plurality of manipulation robot sensors, one or more manipulation robot processor, a manipulation robot remote communication device, and a manipulation robot memory comprising computer program instructions executable by the one or more manipulation robot processors to receive data from and send data to the central server, process data received from each of the plurality of manipulation robot sensors, and output control signals to the manipulation robot mobile base and the at least one manipulator arm, wherein the control signals guide picking of an item with a collision free path throughout a controlled motion of the at least one manipulator arm, wherein the item is one of an individual piece stored openly on a shelf, an individual piece stored in a bin with other items, or a tote.

Aspect 12: The system according to aspects 10 or 11, wherein the central server is configured to send a task list to either or both of the at least one transport robot and the at least one manipulation robot based on at least one item to be picked, wherein the task list includes a location within the logistics facility for the at least one item.

Aspect 13: The system of aspect 12, wherein the task list sent to the at least one manipulation robot includes further includes a unique identification for the at least one item, and the location within the logistics facility for the at least one item includes an identity of a shelf defined by a shelf marker and an identity of a region of interest on the shelf defined by two fiducial markers positioned at horizontal edges of the region of interest.

Aspect 14: The system according to aspect 12 or 13, wherein the task list sent to the at least one manipulation robot further includes a location and orientation of grasping points on the at least one item for an end effector of the manipulator arm to use for grasping the at least one item.

Aspect 15: The system according to aspect 13, wherein the shelf marker comprises a vertically positioned barcode.

Aspect 16: The system according to aspect 13 or 15, wherein the fiducial markers comprise a 2D code.

Aspect 17: The system according to aspect 14, wherein the location within the logistics facility for the at least one item that is part of the task list sent to the at least one transport robot comprises one or more of a pose of a manipulation robot, a position of a human worker, and a conveyance system.

Aspect 18: The system according to any one of aspect 10 to 17, wherein the at least one manipulator arm comprises a first end portion pivotally carried by the mobile base of the manipulation robot, a second end portion comprising an end effector, and an extension tool positioned at or near the second end portion and configured to provide access to the item without interference from surrounding items or infrastructure within a logistics facility.

Aspect 19: The system according to any one of aspects 11 to 18, wherein the at least one manipulation robot is configured to adjust a height of the at least one item containment area to match a height of the transport platform of the transport robot and to transfer the item thereto using the at least one manipulator arm.

Aspect 20: The system according to any one of aspects 10 to 19, wherein the transport platform of the transport robot comprises a conveyance system controllable by the one or more transport robot processors.

Aspect 21: The system according to any one of aspects 10 to 20, wherein each of the at least one transport robot and the at least one manipulation robot comprise a field replaceable battery comprising at least one battery cell, a charging interface for connecting the at least one battery cell to an external power source, and a blind mate connector electrically connected to the at least one battery cell and configured to engage a corresponding blind mate connector on the at least one transport robot or the at least one manipulation robot.

Aspect 22: The system according to aspect 21, wherein each of the at least one transport robot and the at least one manipulation robot are configured to autonomously exchange the field replaceable battery based on signals received from one or both of a charge sensor on the field replaceable battery and the central server.

Aspect 23: A method for order fulfillment within a logistics facility, the method comprising: receiving at a remote server via a server communication interface at least one order including at least one item to be picked; generating at the remote server a global task list based on the at least one order, wherein the task list includes a unique identification for the at least one item, and a first location within the logistics facility for the at least one item; generating a coordinated task list comprising individual tasks for each of a manipulation robot and a transport robot based on the global task list; sending, from the remote server via the server communication interface, the coordinated task list to a server of each of the manipulation robot and the transport robot; moving the manipulation robot autonomously along a route within the logistics facility to a first location for the at least one item, and picking the at least one item from the first location using an arm of the manipulation robot, wherein at least one sensor on the manipulation robot provides signals related to detection, identification, and location of the at least one item to be picked, and one or more processors on the manipulation robot analyze the signals to generate arm control signals to guide an end effector of the arm to pick the at least one piece with a collision free path throughout a controlled motion of the arm.

Aspect 24: The method according to aspect 23, further comprising: moving the transport robot to a pose of the manipulation robot and using the arm of the manipulation robot to transfer the at least one piece or a tote containing the at least one piece from the manipulation robot to the transport robot.

Aspect 25: The method according to aspect 23 or 24, wherein the global task list generated on the remote server may include dynamically defined work zone perimeters, wherein the work zones include robot only work zones, human only work zones, and shared work zones.

Aspect 26: The method according to aspect 25, wherein the work zone perimeters may be updated at any time during an order fulfillment operation.

Aspect 27: The method according to any one of aspects 23 to 26, wherein the transport robot comprises any of the transport robots according to aspects 1 to 9.

Aspect 28: The method according to any one of aspects 23 to 27, wherein the coordinated task list further includes instructions displayed on a user interface screen of either or both of the manipulation robot and the transport robot, wherein the displayed instructions include directions intended for a human worker in the logistics facility.

Aspect 29: The method according to any one of aspects 23 to 28, wherein the first location of the at least one item further includes a position of the human worker.

Aspect 30: The method according to any one of aspects 23 to 29, wherein the coordinated task list further includes a second location within the logistics facility for the at least one item, and in the event that picking the at least one item from the first location is not successful, the method further includes: moving the manipulation robot autonomously along the route within the logistics facility to the second location and picking the at least one item from the second location using an arm of the manipulation robot.

Aspect 31: The method according to aspect 30, wherein the coordinated task list further includes a third location within the logistics facility for the at least one item, and in the event that picking the at least one item from the first and second locations is not successful, the method further includes: moving the manipulation robot autonomously along the route within the logistics facility to the third location and picking the at least one item from the third location using an arm of the manipulation robot.

Aspect 32: The method according to any one of aspects 23 to 31, wherein the coordinated task list sent to the manipulation robot further includes a location and orientation of grasping points on the at least one item for the end effector of the arm to use for grasping the at least one item.

Aspect 33: The method according to any one of aspects 23 to 32, wherein the coordinated task list sent to the manipulation robot includes a unique identification for the at least one item, and the first location within the logistics facility for the at least one item includes an identity of a shelf defined by a shelf marker and an identity of a region of interest on the shelf defined by two fiducial markers positioned at horizontal edges of the region of interest.

Aspect 34: The method according to aspect 33, wherein the shelf marker comprises a vertically positioned barcode.

Aspect 35: The method according to aspect 33 or 34, wherein the fiducial markers comprise a 2D code.

Aspect 36: A method for autonomous robot navigation and region of interest localization, the method comprising: receiving data captured by a sensor coupled to a robotic device during navigation of the robotic device; analyzing the received data to detect at least one identifier corresponding to a region of interest; for each detected identifier: using the data to determine a current pose of the robotic device within a logistics facility; and generating a navigation instruction for navigation of the robotic device to a location of an item, the navigation instruction based on the current pose of the robotic device and a location of a region of interest at which the item is located.

Aspect 37: The method according to aspect 36, wherein the at least one identifier comprises two fiducial markers positioned at horizontal edges of the region of interest.

Aspect 38: The method according to aspect 36 or 37, wherein each of the two fiducial markers comprise 2D codes.

Aspect 39: The method according to any one of aspects 36 to 38, wherein the at least one identifier comprises: a first fiducial marker that defines an x and y coordinate of a storage rack within the logistics facility, and at least one second fiducial marker that defines an x, y, and z coordinate on the storage rack of the region of interest.

Aspect 40: The method according to any one of aspects 36 to 39, wherein the at least one second fiducial marker comprises two 2D-code markers positioned at horizontal edges of region of interest.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:
1. A logistics facility automation system comprising:
   a central server; and
   at least one autonomous mobile robot comprising:
   a mobile base having a flat top surface and a horizontal cavity positioned within a front portion of the mobile base,
   a laser ranging device positioned centrally in the horizontal cavity of the mobile base, wherein the horizontal cavity slopes toward a back of the mobile base on each of a left and right side thereof providing an opening that affords the laser ranging device a 270-degree field of view on a horizontal plane elevated from and parallel with a floor surface,
   an internal cavity within the mobile base having an opening on a back side of the mobile base,
   a field replaceable battery designed and configured to fit within the internal cavity of the mobile base,
   one or more robot processors,
   a robot remote communication device, and
   a robot memory comprising computer program instructions executable by the one or more robot processors to receive data from and send data to the central server, process data received from the laser ranging device, and output control signals to drive wheels of the mobile base, wherein the central server is configured to send a task list to the at least one autonomous mobile robot including a destination location within the logistics facility.

2. The system of claim 1, wherein the destination location within the logistics facility comprises one or both of a position of a human worker and a conveyance system.

3. The system of claim 1, wherein the autonomous mobile robot comprises:
at least one attachment arm vertically mounted on the flat top surface, and
a transport platform positioned above and vertically separated from the mobile base via connection to an end of the at least one attachment arm distal from the mobile base.

4. The system of claim 3, wherein the transport platform of the autonomous mobile robot comprises a conveyance system controllable by the one or more robot processors.

5. The system of claim 1 wherein the autonomous mobile robot includes forward and rear facing cameras.

6. The system of claim 1, wherein the field replaceable battery comprises at least one battery cell, a charging interface for connecting the at least one battery cell to an external power source, and a blind mate connector electrically connected to the at least one battery cell and configured to engage a corresponding blind mate connector on the at least one autonomous mobile robot.

7. The system of claim 6, wherein the at least one autonomous mobile robot is configured to autonomously exchange the field replaceable battery based on signals received from one or both of a charge sensor on the field replaceable battery and the central server.

8. An autonomous mobile robot comprising:
a mobile base having a flat top surface comprising at least one vertically mounted attachment arm and a horizontal cavity positioned within a front portion of the mobile base;
a transport platform positioned above and vertically separated from the mobile base via connection to an end of the at least one attachment arm distal from the mobile base;
a plurality of sensors including a laser ranging device, wherein the laser ranging device is positioned centrally in the horizontal cavity of the mobile base, wherein the horizontal cavity slopes toward a back of the mobile base on each of a left and right side thereof providing an opening that affords the laser ranging device a 270-degree field of view on a horizontal plane elevated from and parallel with a floor surface;
a remote communication interface;
drive wheels positioned on a bottom surface of the mobile base and configured to provide forward and reverse movement of the mobile base;
a memory configured to store robot specific information; and
one or more processors coupled to the plurality of sensors, the memory, and the mobile base,
wherein the memory comprises computer program instructions executable by the one or more processors to receive data from and send data to a central server, process data received from each of the sensors, and output control signals to drive wheels of the mobile base.

9. An autonomous mobile robot comprising:
a mobile base comprising a flat top surface and a horizontal cavity positioned within a front portion of the mobile base;
a laser ranging device positioned centrally in the horizontal cavity of the mobile base, wherein the horizontal cavity slopes toward a back of the mobile base on each of a left and right side thereof providing an opening that affords the laser ranging device a 270-degree field of view on a horizontal plane elevated from and parallel with a floor surface;
an internal cavity within the mobile base having an opening on a back side of the mobile base;
a field replaceable battery designed and configured to fit within the internal cavity of the mobile base;
one or more processors;
a remote communication device; and
a memory comprising computer program instructions executable by the one or more processors to receive data from and send data to a central server, process data received from each of the plurality of sensors, and output control signals to drive wheels of the mobile base.

10. The robot of claim 9, wherein the field replaceable battery comprises at least one battery cell, a charging interface for connecting the at least one battery cell to an external power source, and a blind mate connector electrically connected to the at least one battery cell and configured to engage a corresponding blind mate connector on the autonomous mobile robot.

11. The robot of claim 10, wherein the field replaceable battery comprises a self-contained charging circuit that is connectable to an external power source.

12. The robot of claim 10, wherein the autonomous mobile robot is configured to autonomously exchange the field replaceable battery based on signals received from a charge sensor on the field replaceable battery.

13. The system of claim 1, wherein the autonomous mobile robot is configured to autonomously navigate to a battery charging station based on signals received from one or both of a charge sensor on the field replaceable battery and the central server.

14. The robot of claim 8, further including a field replaceable battery comprising at least one battery cell, a charging interface for connecting the at least one battery cell to an external power source, and a blind mate connector electrically connected to the at least one battery cell and configured to engage a corresponding blind mate connector on the autonomous mobile robot.

15. The robot of claim 14, wherein the autonomous mobile robot is configured to autonomously exchange the field replaceable battery based on signals received from a charge sensor on the field replaceable battery.

16. The robot of claim 14, wherein the autonomous mobile robot is configured to autonomously exchange the field replaceable battery based on signals received from the central server.

17. The robot of claim 14, wherein the autonomous mobile robot is configured to autonomously navigate to a battery charging station based on signals received from one or both of a charge sensor on the field replaceable battery and the central server.

18. The robot of claim 10, wherein the autonomous mobile robot is configured to autonomously navigate to a battery charging station based on signals received from one or both of a charge sensor on the field replaceable battery and the central server.

19. The system of claim 1, wherein the horizontal cavity slopes from the front portion of the mobile base backward to a point 0.3× to 0.5× a longitudinal length of the mobile base.

20. The robot of claim 9, wherein the horizontal cavity slopes from the front portion of the mobile base backward to a point 0.3× to 0.5× a longitudinal length of the mobile base.

\* \* \* \* \*